US012020625B2

United States Patent

Kim

(12) United States Patent
(10) Patent No.: US 12,020,625 B2
(45) Date of Patent: Jun. 25, 2024

(54) DISPLAY APPARATUS

(71) Applicant: Samsung Display Co., Ltd., Yongin-si (KR)

(72) Inventor: Sang Kuk Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 58 days.

(21) Appl. No.: 17/747,427

(22) Filed: May 18, 2022

(65) Prior Publication Data

US 2023/0036625 A1 Feb. 2, 2023

(30) Foreign Application Priority Data

Jul. 30, 2021 (KR) ........................ 10-2021-0100764

(51) Int. Cl.
*G09G 3/20* (2006.01)

(52) U.S. Cl.
CPC ....... *G09G 3/2092* (2013.01); *G09G 2330/02* (2013.01); *G09G 2330/04* (2013.01); *G09G 2330/08* (2013.01)

(58) Field of Classification Search
CPC ............. G09G 3/2092; G09G 2330/02; G09G 2330/04; G09G 2330/08; G09G 2330/12; G09G 2330/06; H02H 9/045; H05K 9/0054; H05K 9/0067; H05K 2201/10128
See application file for complete search history.

(56) References Cited

U.S. PATENT DOCUMENTS

| | | | | |
|---|---|---|---|---|
| 5,463,408 A * | 10/1995 | Mio | G09G 3/3696 345/52 |
| 6,580,409 B1 * | 6/2003 | Ito | G09G 3/30 345/80 |
| 6,839,097 B2 * | 1/2005 | Park | G02F 1/136204 349/40 |
| 11,094,292 B2 * | 8/2021 | Zhou | G09G 5/10 |
| 2001/0011980 A1 * | 8/2001 | Jang | G09G 3/3648 345/87 |

(Continued)

FOREIGN PATENT DOCUMENTS

| | | |
|---|---|---|
| KR | 1020010019356 A | 3/2001 |
| KR | 100308087 B1 | 11/2001 |

(Continued)

*Primary Examiner* — Jose R Soto Lopez
(74) *Attorney, Agent, or Firm* — CANTOR COLBURN LLP

(57) ABSTRACT

A display apparatus includes: a first power line, a second power line, an IC region, a printed circuit board region, and a display panel. The IC region includes a logic block receiving a first power voltage from the first power line, an analog block receiving a second power voltage from the second power line, a first IC ground connected to the logic block, and a second IC ground connected to the analog block. The printed circuit board region includes a printed circuit board ground connected to the first IC ground and the second IC ground, a transient voltage suppressor diode including a first electrode connected to the second power line and a second electrode connected to the printed circuit board ground, and a board switch performing a switching operation between the printed circuit board ground and the first IC ground. The display panel is connected to the IC region.

18 Claims, 25 Drawing Sheets

(56) References Cited

U.S. PATENT DOCUMENTS

| | | | | |
|---|---|---|---|---|
| 2004/0109275 A1* | 6/2004 | Whitney | H01C 7/021 | 361/93.1 |
| 2004/0212562 A1* | 10/2004 | Kim | G09G 3/2965 | 345/60 |
| 2005/0093769 A1* | 5/2005 | Ushigusa | G09G 3/3216 | 345/3.2 |
| 2005/0156835 A1* | 7/2005 | Sato | G09G 3/3216 | 345/76 |
| 2005/0185357 A1* | 8/2005 | Hoopes | H01R 13/6666 | 361/119 |
| 2005/0237275 A1* | 10/2005 | Inoue | G09G 3/2965 | 345/60 |
| 2006/0170641 A1* | 8/2006 | Song | G09G 3/3696 | 345/98 |
| 2007/0001978 A1* | 1/2007 | Cho | G09G 3/3655 | 345/98 |
| 2007/0132557 A1* | 6/2007 | Kang | G06K 19/0701 | 340/572.1 |
| 2007/0176855 A1* | 8/2007 | Lee | G09G 3/2965 | 345/60 |
| 2007/0176856 A1* | 8/2007 | Lee | G09G 3/2965 | 345/60 |
| 2007/0211020 A1* | 9/2007 | Nihei | G09G 3/344 | 345/108 |
| 2007/0247448 A1* | 10/2007 | Lin | G09G 5/363 | 345/204 |
| 2007/0291042 A1* | 12/2007 | Kwak | G09G 3/3688 | 345/535 |
| 2008/0143655 A1* | 6/2008 | Ko | G09G 3/3291 | 345/82 |
| 2009/0184951 A1* | 7/2009 | Kim | G09G 3/296 | 345/212 |
| 2009/0279008 A1* | 11/2009 | Lee | H01L 27/0248 | 349/40 |
| 2009/0309498 A1* | 12/2009 | Park | G02F 1/133603 | 315/32 |
| 2010/0053130 A1* | 3/2010 | Hsu | G09G 3/3688 | 345/206 |
| 2010/0156307 A1* | 6/2010 | Kim | H05B 45/38 | 315/291 |
| 2011/0018914 A1* | 1/2011 | Ishikawa | G09G 3/3426 | 345/691 |
| 2011/0063277 A1* | 3/2011 | Menke | G06F 1/305 | 345/212 |
| 2012/0154167 A1* | 6/2012 | Jones | H02H 9/042 | 361/111 |
| 2012/0162279 A1* | 6/2012 | Kim | G09G 3/3406 | 345/690 |
| 2013/0042033 A1* | 2/2013 | Zhou | G06F 3/023 | 710/63 |
| 2013/0107409 A1* | 5/2013 | McGee | H02H 9/02 | 361/91.1 |
| 2013/0271883 A1* | 10/2013 | Chang | G01R 31/002 | 361/56 |
| 2014/0160182 A1* | 6/2014 | Hong | G09G 5/02 | 345/691 |
| 2014/0184959 A1* | 7/2014 | Zhang | H05B 45/10 | 315/193 |
| 2014/0354609 A1* | 12/2014 | Sawabe | G09G 3/3677 | 345/204 |
| 2015/0116302 A1* | 4/2015 | Kim | G09G 3/3208 | 345/212 |
| 2015/0116382 A1* | 4/2015 | Im | H05B 45/3725 | 345/691 |
| 2015/0188431 A1* | 7/2015 | Cho | G09G 3/3225 | 345/212 |
| 2015/0213775 A1* | 7/2015 | Lee | G09G 3/3688 | 345/212 |
| 2015/0342098 A1* | 11/2015 | Lai | H03K 19/00346 | 361/56 |
| 2015/0355749 A1* | 12/2015 | Min | G06F 3/0416 | 345/174 |
| 2016/0014857 A1* | 1/2016 | Park | H05B 45/60 | 315/294 |
| 2016/0342373 A1* | 11/2016 | Huang | H05K 5/0247 | |
| 2017/0039984 A1* | 2/2017 | Joo | H05K 1/0256 | |
| 2017/0263567 A1* | 9/2017 | Moon | G09G 3/2092 | |
| 2017/0322608 A1* | 11/2017 | Lee | G09G 3/3233 | |
| 2017/0366001 A1* | 12/2017 | Cao | H01L 27/0647 | |
| 2018/0075790 A1* | 3/2018 | Abernathy | G02F 1/136204 | |
| 2018/0287486 A1* | 10/2018 | Peng | H02M 1/34 | |
| 2018/0292720 A1* | 10/2018 | Lu | H01L 31/167 | |
| 2018/0375323 A1* | 12/2018 | Eberts | B64D 45/02 | |
| 2019/0027927 A1* | 1/2019 | Chemisky | H02H 9/042 | |
| 2019/0102022 A1* | 4/2019 | Jang | G06F 3/044 | |
| 2019/0122611 A1* | 4/2019 | Nam | G09G 3/3258 | |
| 2019/0147790 A1* | 5/2019 | Chung | G09G 3/006 | 345/213 |
| 2019/0163003 A1* | 5/2019 | Kim | G02F 1/133305 | |
| 2020/0014380 A1* | 1/2020 | Jo | H02H 9/045 | |
| 2020/0033979 A1* | 1/2020 | Sauer | G09G 3/32 | |
| 2020/0053868 A1* | 2/2020 | Park | H05K 1/0213 | |
| 2020/0059228 A1* | 2/2020 | Parthasarathy | H03K 17/04123 | |
| 2020/0076182 A1* | 3/2020 | Huang | G09G 3/36 | |
| 2020/0083816 A1* | 3/2020 | Kim | G09G 3/20 | |
| 2020/0090572 A1* | 3/2020 | Wu | G09G 3/3233 | |
| 2020/0160808 A1* | 5/2020 | Inokuchi | G09G 3/3696 | |
| 2020/0219442 A1* | 7/2020 | Zhu | G09G 3/3225 | |
| 2020/0402447 A1* | 12/2020 | An | H05K 9/0007 | |
| 2021/0020096 A1* | 1/2021 | Kim | H02M 1/32 | |
| 2021/0035491 A1* | 2/2021 | Ishimaru | G09G 3/32 | |
| 2021/0201757 A1* | 7/2021 | Kim | G09G 3/3225 | |
| 2021/0209999 A1* | 7/2021 | Kaestle | H03K 17/693 | |
| 2021/0225220 A1* | 7/2021 | Huang | G09G 3/3648 | |
| 2021/0225296 A1* | 7/2021 | Chen | H02M 3/158 | |
| 2021/0251066 A1* | 8/2021 | Bonne | H05B 45/10 | |
| 2021/0273095 A1* | 9/2021 | Qiao | H01L 29/66083 | |
| 2021/0367383 A1* | 11/2021 | Dhanasekaran | H02H 9/041 | |
| 2022/0114981 A1* | 4/2022 | Wang | G09G 3/3611 | |
| 2022/0285833 A1* | 9/2022 | Wei | H01Q 1/2266 | |
| 2022/0320078 A1* | 10/2022 | Wang | H01L 27/0296 | |
| 2022/0328016 A1* | 10/2022 | Wang | G09G 3/3688 | |
| 2022/0415256 A1* | 12/2022 | Hoon Lee | G09G 3/3258 | |
| 2023/0152616 A1* | 5/2023 | Wang | G02F 1/13338 | 359/245 |

FOREIGN PATENT DOCUMENTS

| | | | |
|---|---|---|---|
| KR | 100323454 | B1 | 2/2002 |
| KR | 100606883 | B1 | 8/2006 |
| KR | 100866716 | B1 | 11/2008 |
| KR | 1020080100529 | A | 11/2008 |

* cited by examiner

DISPLAY APPARATUS

This application claims priority to Korean Patent Application No. 10-2021-0100764, filed on Jul. 30, 2021, and all the benefits accruing therefrom under 35 U.S.C. § 119, the content of which in its entirety is herein incorporated by reference.

BACKGROUND

1. Field

Embodiments of the present invention relate to a display apparatus. More particularly, embodiments of the present invention relate to a display apparatus for preventing a soft fail of the display apparatus due to an electrostatic discharge.

2. Description of the Related Art

Generally, a display apparatus may include a display panel and a display panel driver. The display panel may include gate lines, data lines, and pixels electrically connected to the gate lines and the data lines. The display panel driver may include a gate driver providing a gate signal to the pixels through the gate lines, a data driver providing a data voltage to the pixels through the data lines, and a driving controller controlling the gate driver and the data driver.

An integrated circuit (hereinafter referred to as "IC") in the display apparatus may receive electrical signals through a printed circuit board. When an electrostatic discharge current generated by an electrostatic discharge flows through a ground of the printed circuit board, the electrostatic discharge current may flow into the ICs in the display apparatus. As a result, a soft fail of IC may occur.

SUMMARY

Embodiments of the present invention provide a display apparatus that performs a switching operation so that an electrostatic discharge current generated by an electrostatic discharge ESD does not flow into a logic block.

In embodiments of a display apparatus according to the present invention, a display apparatus includes: a first power line; a second power line; an IC region including a logic block which receives a first power voltage from the first power line, an analog block which receives a second power voltage from the second power line, a first IC ground connected to the logic block, and a second IC ground connected to the analog block; a printed circuit board region including a printed circuit board ground connected to the first IC ground and the second IC ground, a transient voltage suppressor diode including a first electrode connected to the second power line and a second electrode connected to the printed circuit board ground, and a board switch which performs a first switching operation between the printed circuit board ground and the first IC ground; and a display panel connected to the IC region.

In an embodiment, the board switch may be configured to perform the first switching operation based on a detection voltage of the first electrode of the transient voltage suppressor diode.

In an embodiment, the printed circuit board region may further include a board switch controller which generates a board adjustment detection voltage based on the detection voltage. The board switch may be configured to perform the first switching operation based on the board adjustment detection voltage.

In an embodiment, the IC region may further include an IC switch which performs a second switching operation between the logic block and the first IC ground.

In an embodiment, the IC switch may be configured to perform the second switching operation based on a detection voltage of the first electrode of the transient voltage suppressor diode.

In an embodiment, the IC region may further include an IC switch controller which generates an IC adjustment detection voltage based on the detection voltage. The IC switch may be configured to perform the second switching operation based on the IC adjustment detection voltage.

In an embodiment, the first power voltage may be less than the second power voltage.

In embodiments of a display apparatus according to the present invention, the display apparatus includes: a first power line; a second power line; an IC region including a logic block which receives a first power voltage from the first power line, an analog block which receives a second power voltage from the second power line, a first IC ground connected to the logic block, a second IC ground connected to the analog block, and an IC switch which performs a switching operation between the logic block and the first IC ground; a printed circuit board region including a printed circuit board ground connected to the first IC ground and the second IC ground, and a transient voltage suppressor diode including a first electrode connected to the second power line and a second electrode connected to the printed circuit board ground; and a display panel connected to the IC region.

In an embodiment, the IC switch may be configured to perform the switching operation based on a detection voltage of the first electrode of the transient voltage suppressor diode.

In an embodiment, the IC region may further include an IC switch controller which generates an IC adjustment detection voltage based on the detection voltage. The IC switch may be configured to perform the switching operation based on the IC adjustment detection voltage.

In an embodiment, the first power voltage may be less than the second power voltage.

In embodiments of a display apparatus according to the present invention, the display apparatus includes: a first power line; a second power line; an IC region including a logic block which receives a first power voltage from the first power line, an analog block which receives a second power voltage from the second power line, a first IC ground connected to the logic block, and a second IC ground connected to the analog block; a printed circuit board region including a printed circuit board ground connected to the first IC ground and the second IC ground, an electrostatic discharge current (ESD) detection circuit disposed between the second power line and the printed circuit board ground, and a board switch which performs a third switching operation between the printed circuit board ground and the first IC ground; and a display panel connected to the IC region.

In an embodiment, the ESD detection circuit may include a detection resistor element and a detection capacitor element connected to the detection resistor element in series.

In an embodiment, the board switch may be configured to perform the third switching operation based on a detection signal of the ESD detection circuit.

In an embodiment, the printed circuit board region may further include a board switch controller which generates a board adjustment detection signal based on the detection signal. The board switch may be configured to perform the third switching operation based on the board adjustment detection signal.

In an embodiment, the IC region may further includes an IC switch which performs a fourth switching operation between the logic block and the first IC ground.

In an embodiment, the IC switch may be configured to perform the fourth switching operation based on a detection signal of the ESD detection circuit.

In an embodiment, the IC region may further include an IC switch controller which generates an IC adjustment detection signal based on the detection signal. The IC switch may be configured to perform the fourth switching operation based on the IC adjustment detection signal.

In an embodiment, the printed circuit board region may further include a transient voltage suppressor diode including a first electrode connected to the second power line and a second electrode connected to the printed circuit board ground.

In an embodiment, the first power voltage may be less than the second power voltage.

The display apparatus according to embodiments may prevent a soft fail of a logic block by preventing an electrostatic discharge current generated by an electrostatic discharge from flowing into the logic block.

The display apparatus according to embodiments may prevent a permanent hard fail of ICs and an erroneous operation of the logic block by performing a switching operation based on a voltage of an electrode of a transient voltage suppressor diode.

The display apparatus according to embodiments may more appropriately block the electrostatic discharge current flowing into the logic block by adjusting a timing and a duration of the switching operation.

The display apparatus according to embodiments may prevent a switch from being destroyed due to an overcurrent by controlling a current for operating the switch through the resistor.

However, the effects of the present invention are not limited to the above-described effects, and may be variously expanded without departing from the spirit and scope of the present invention.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION

It will be understood that when an element is referred to as being "connected to" another element, it can be directly connected to the other element or intervening elements may be present therebetween. In contrast, when an element is referred to as being "directly connected to" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
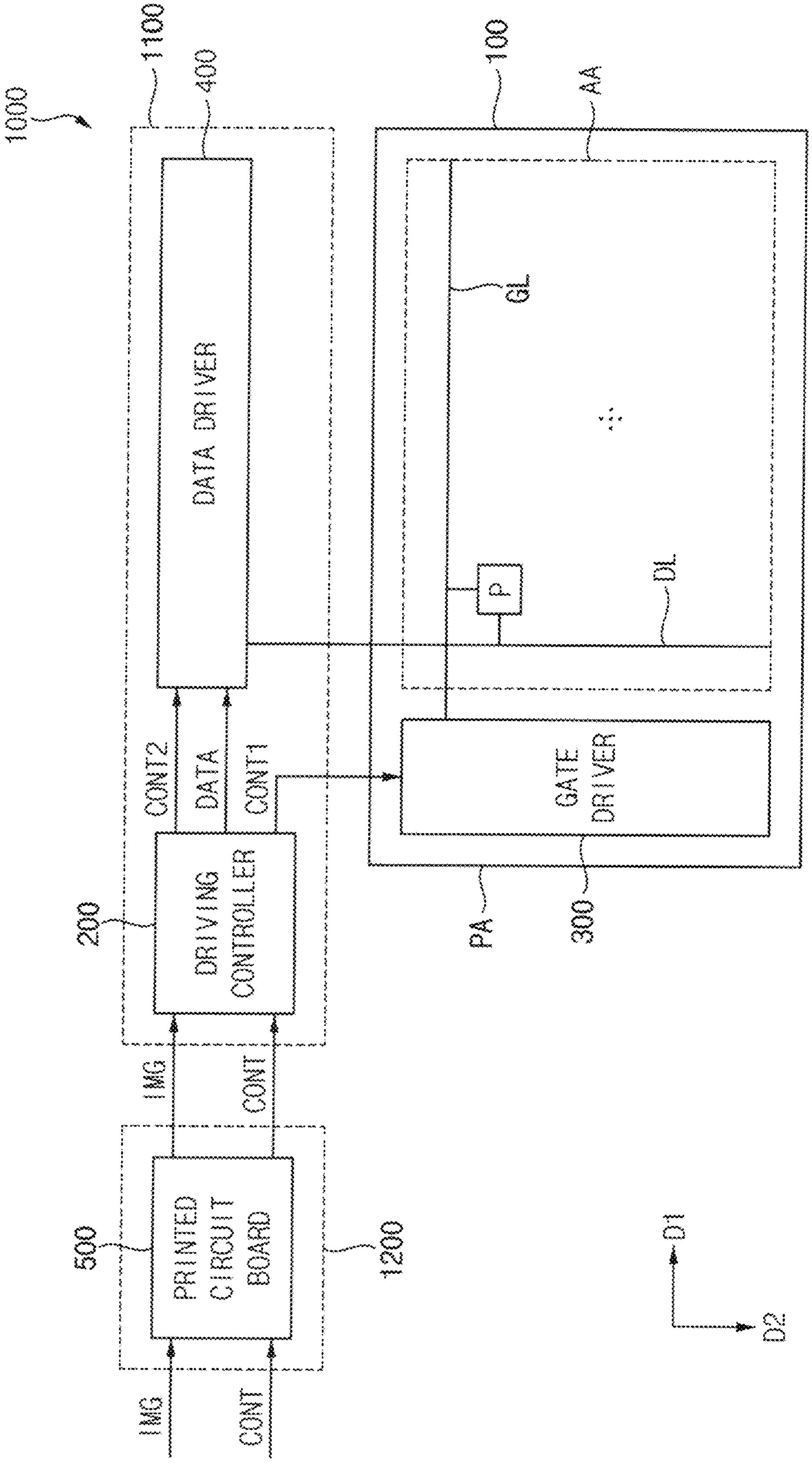
FIG. 1 is a block diagram illustrating a display apparatus according to embodiments of the present invention.

FIG. 1 is a block diagram illustrating a display apparatus 1000 according to embodiments of the present invention.

Referring to FIG. 1, the display apparatus 1000 may include a display panel 100, a printed circuit board 500, and a display panel driver. The display panel driver may include a driving controller 200, a gate driver 300, and a data driver 400. For example, the driving controller 200 and the data driver 400 may be integrated into one chip.

An Integrated circuit ("IC") region 1100 may include the driving controller 200 and the data driver 400. For example, the IC region 1100 may include chips in which the driving controller 200 and the data driver 400 are integrated. In another embodiment, for example, the IC region 1100 may include a single chip in which the driving controller 200 and the data driver 400 are integrated. For example, the IC region 1100 may be mounted on a glass, a film, or a plastic using a chip on glass ("COG"), a chip-on-film ("COF"), or a chip on plastic ("COP") method.

A printed circuit board region 1200 may be a region including the printed circuit board 500. For example, the printed circuit board 500 may be a flexible printed circuit board ("FPCB").

The display panel 100 has a display region AA on which an image is displayed and a peripheral region PA adjacent to the display region AA. The display panel 100 may be connected to the IC region 1100. The display panel 100 may receive a data voltage from the IC region 1100 and display an image.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 200 may receive input image data IMG and an input control signal CONT from an external apparatus (e.g., a graphic processing unit ("GPU")). For example, the input image data IMG may include red image data, green image data and blue image data. According to an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and a data signal DATA based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and generate the data signal DATA based on the input image data IMG. The driving controller 200 may output the data signal DATA to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The data driver 400 may receive the second control signal CONT2 and the data signal DATA from the driving controller 200. The data driver 400 may convert the data signal DATA into a data voltage having an analog type. The data driver 400 may output the data voltage to the data lines DL.

The printed circuit board 500 may apply the input image data IMG and the input control signal CONT received from the external apparatus to the driving controller 200. The printed circuit board 500 may transmit driving voltages for driving the display apparatus 1000 from a power supply apparatus (e.g., a power management integrated circuit ("PMIC")) to the IC region 1100. The driving voltages may include a first power voltage VDDI and a second power voltage VCI, which will be described later.

Figure 2:
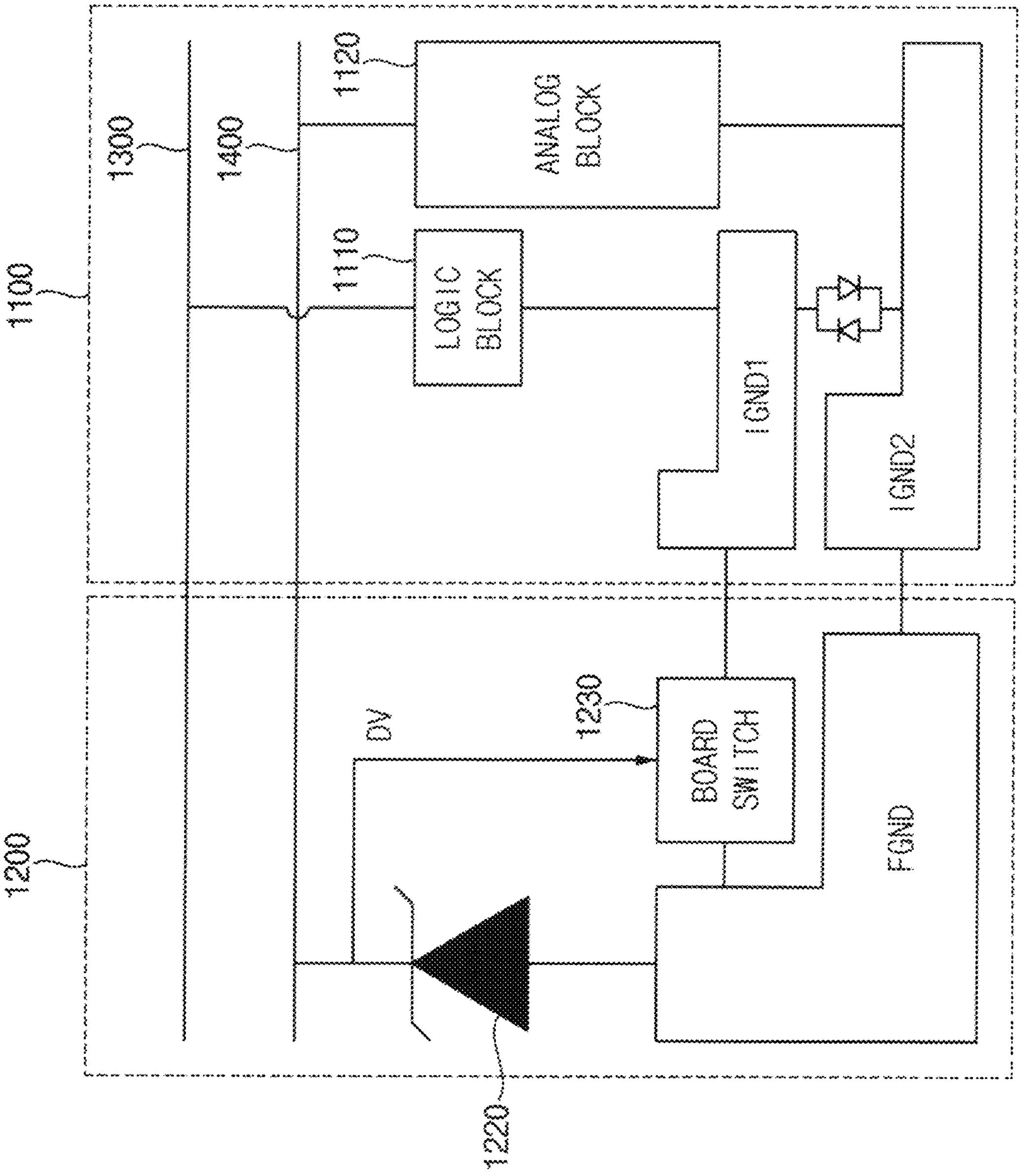
FIG. 2 is a diagram illustrating an example of an IC region and a printed circuit board region of the display apparatus of FIG. 1.
Figure 3:
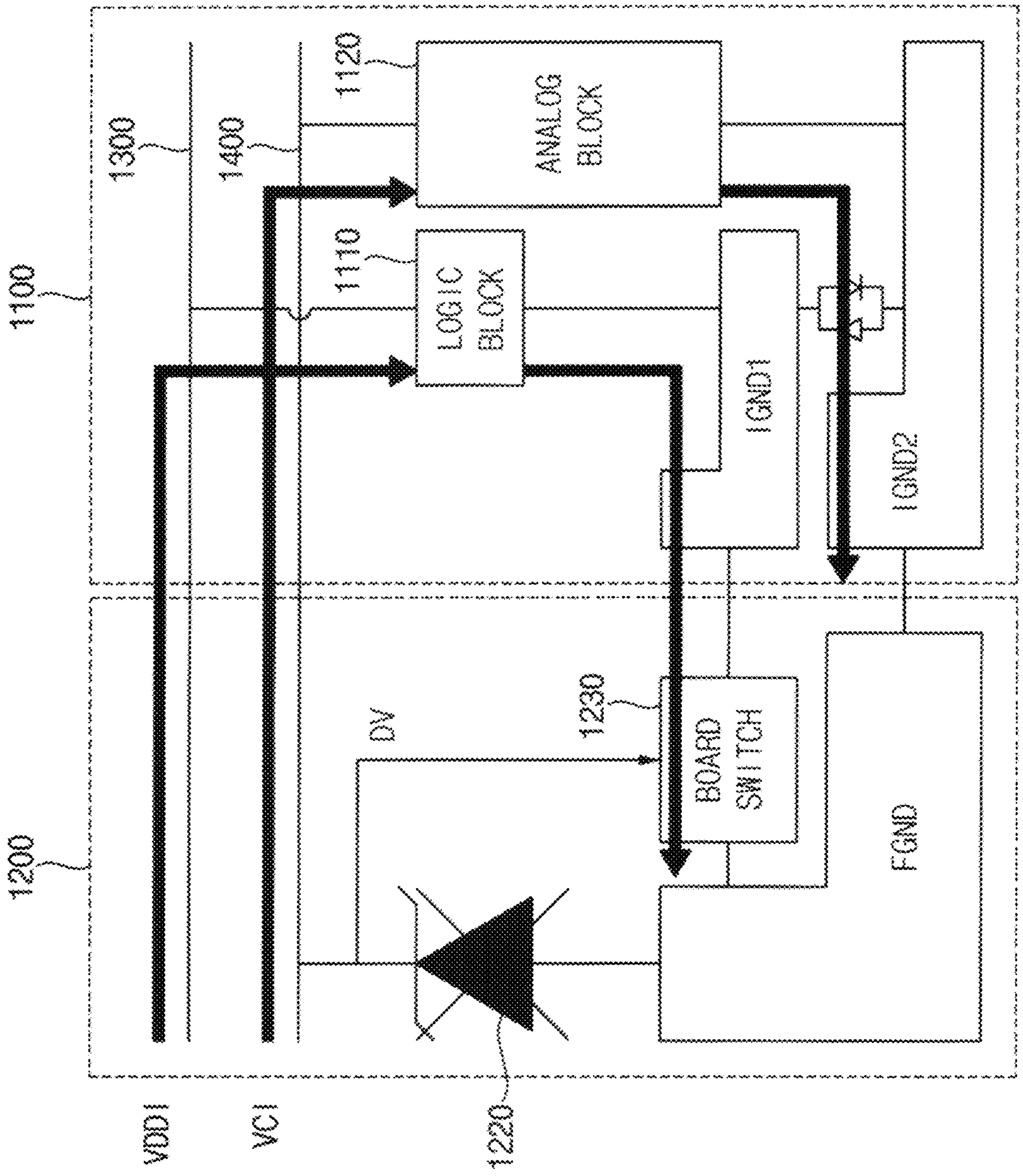
FIG. 3 is a diagram illustrating an example in which a first power voltage and a second power voltage flow through the display apparatus of FIG. 1.
Figure 4:
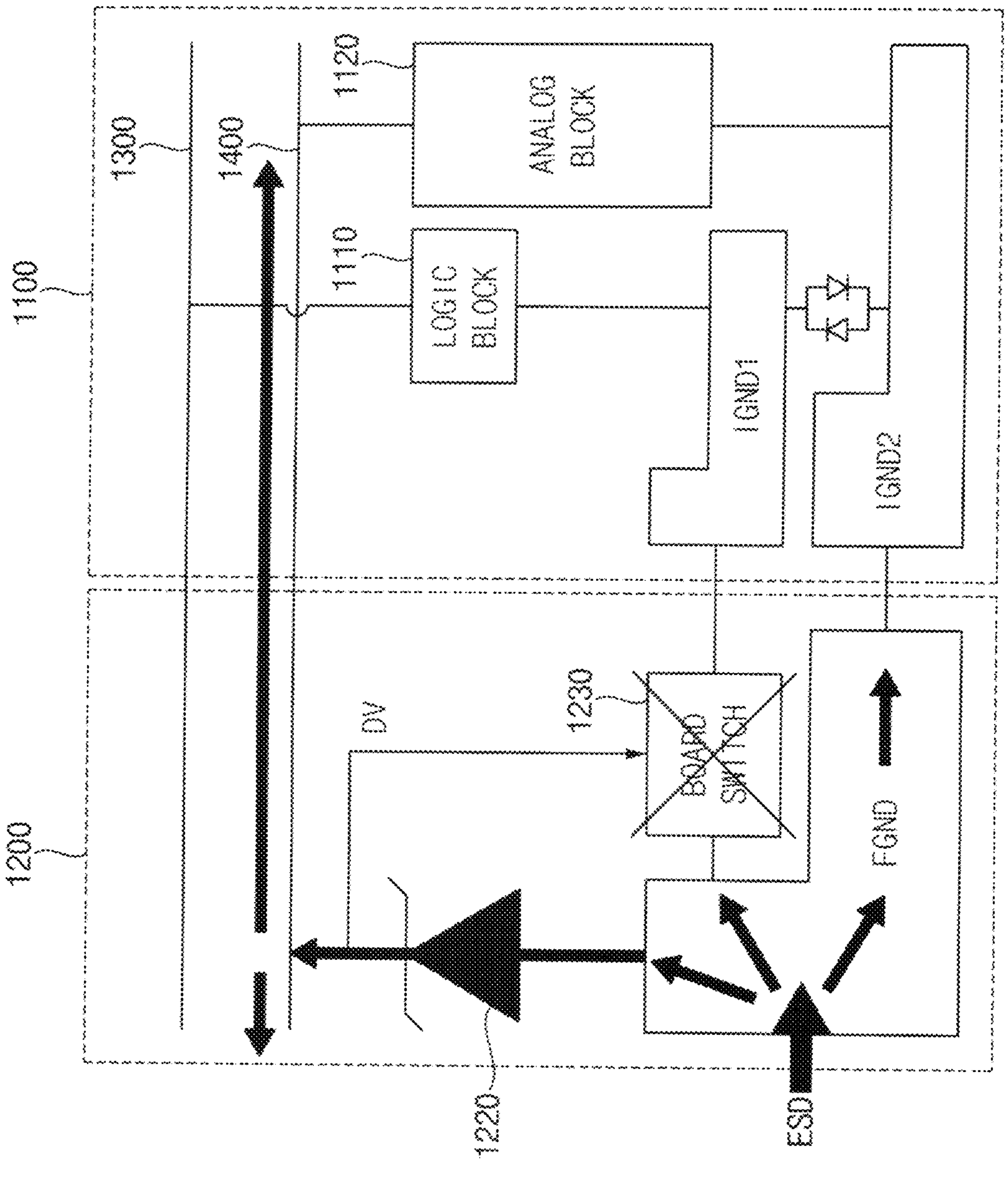
FIG. 4 is a diagram illustrating an example in which an electrostatic discharge current flows through the display apparatus of FIG. 1.

FIG. 2 is a diagram illustrating an example of the IC region 1100 and the printed circuit board region 1200 of the display apparatus 1000 of FIG. 1, and FIG. 3 is a diagram illustrating an example in which the first power voltage VDDI and the second power voltage VCI flow through the display apparatus 1000 of FIG. 1. Specifically, FIG. 3 illustrates an example in which the first power voltage VDDI and the second power voltage VCI flow through the display apparatus 1000 of FIG. 1 when the electrostatic discharge current ESD does not flow through the display apparatus 1000 of FIG. 1. FIG. 4 is a diagram illustrating an example in which the electrostatic discharge current ESD flows through the display apparatus 1000 of FIG. 1. The electrostatic discharge current ESD means a current generated by an electrostatic discharge.

Referring to FIGS. 2 to 4, the display apparatus 1000 may include the IC region 1100, the printed circuit board region 1200, a first power line 1300, and a second power line 1400.

The IC region 1100 may include a logic block 1110, an analog block 1120, a first IC ground IGND1, and a second IC ground IGND2.

The logic block 1110 may receive the first power voltage VDDI from the first power line 1300. The logic block 1110 may be a block including a logic circuit. For example, the logic block 1110 may be a block in which an arbitrary setting value is stored. For example, the logic block 1110 may be a block for performing register setting. For example, the logic block 1110 may be a block including a memory. For example, when the IC region 1100 is mounted in a chip-on-film (COF) method, the logic block 1110 may be a block including a test circuit. The logic block 1110 may be sensitive to shaking (i.e., fluctuation) of a voltage of the first IC ground IGND1. When the value calculated by the logic block 1110 is changed by a soft fail due to the shaking, overall driving of the display apparatus 1000 may be affected.

The analog block 1120 may receive the second power voltage VCI from the second power line 1400. The analog block 1120 may include a circuit in which analog data are used. For example, the analog block 1120 may be a block including a circuit for converting the data signal DATA which is a digital signal into an analog voltage type. For example, the analog block 1120 may include a buffer included in the data driver 400. Since the analog block 1120 does not store any value, a defect of the analog block 1120 may not be fixed even when an erroneous operation occurs.

The first IC ground IGND1 may be connected to the logic block 1110. The second IC ground IGND2 may be connected to the analog block 1120. The first IC ground IGND1 and the second IC ground IGND2 may have the same electric potential. The first IC ground IGND1 and the second IC ground IGND2 may be connected to each other by two diodes disposed in opposite directions.

The printed circuit board region 1200 may include a printed circuit board ground FGND, a transient voltage suppressor diode 1220, and a board switch 1230.

The printed circuit board ground FGND may be connected to the first IC ground IGND1 and the second IC ground IGND2. The printed circuit board ground FGND may have an electric potential same as the electric potential of the first IC ground IGND1 and the electric potential of the second IC ground IGND2. For example, the printed circuit board ground FGND may be connected to the first IC ground IGND1 and the second IC ground IGND2 through a plurality of pins.

The transient voltage suppressor diode 1220 may include a first electrode connected to the second power line 1400 and a second electrode connected to the printed circuit board ground FGND. An operation of the transient voltage suppressor diode 1220 will be described later.

The board switch 1230 may perform a switching operation between the printed circuit board ground FGND and the first IC ground IGND1. The board switch 1230 may perform the switching operation based on a detection voltage DV detected from the first electrode of the transient voltage suppressor diode 1220. For example, the board switch 1230 may include an element capable of performing a high-speed switching operation. For example, the board switch 1230 may include an inverter and a PMOS transistor. For example, the board switch 1230 may be a high-speed relay. The operation of the board switch 1230 will be described later.

The first power voltage VDDI may be applied to the first power line 1300. The second power voltage VCI may be applied to the second power line 1400. In an embodiment, the first power voltage VDDI may be less than the second power voltage VCI. For example, since the first power voltage VDDI is applied to the logic block 1110 including the logic circuit, the first power voltage VDDI may be less than the second power voltage VCI.

Referring to FIGS. 3 and 4, the transient voltage suppressor diode 1220 may be in a turn-on state when the electrostatic discharge current ESD flows, and may be in a turn-off state when the electrostatic discharge current ESD does not flow. The board switch 1230 may be in a turn-on state when the detection voltage DV is the same as the second power voltage VCI. The board switch 1230 may be in a turn-off state when the electrostatic discharge current ESD flows.

For example, the board switch 1230 may include an inverter to which the detection voltage DV is applied and a p-type transistor including a control electrode connected to the inverter. In this case, when the electrostatic discharge current ESD does not flow, the board switch 1230 may be turned on. When the electrostatic discharge current ESD flows, the electrostatic discharge current ESD flows to a dynamic resistance of the transient voltage suppressor diode 1220, so that the detection voltage DV may have a large negative voltage. That is, an absolute value of the detection voltage DV may become larger when the electrostatic discharge current ESD flows to the dynamic resistance of the transient voltage suppressor diode 1220 than the electrostatic discharge current ESD does not flow to the dynamic resistance of the transient voltage suppressor diode 1220, the polarity of the detection voltage DV may become opposite when the electrostatic discharge current ESD flows to the dynamic resistance of the transient voltage suppressor diode 1220 compared to when the electrostatic discharge current ESD does not flow to the dynamic resistance of the transient voltage suppressor diode 1220. Even though the dynamic resistance is low, the detection voltage DV may have the large negative voltage because of the high electrostatic discharge current ESD. By passing the large negative voltage through the inverter, the board switch 1230 may be in the turn-off state.

For example, the board switch 1230 may be the high-speed relay. The high-speed relay may be in a turn-off state when the detection voltage DV is changed to be greater than a preset reference voltage. The reference voltage may be greater than the second power voltage VCI. Accordingly, when the electrostatic discharge current ESD does not flow, the board switch 1230 may be in the turn-on state. When the electrostatic discharge current ESD flows, the electrostatic discharge current ESD flows through the dynamic resistance of the transient voltage suppressor diode 1220, so that the detection voltage DV may be changed to be greater than the reference voltage. Due to this, the board switch 1230 may be in the turn-off state.

Referring to FIG. 3, when the electrostatic discharge current ESD does not flow, the transient voltage suppressor diode 1220 may be in the turn-off state and the board switch 1230 may be in the turn-on state. The first power voltage VDDI may be applied to the logic block 1110 through the first power line 1300. A current generated by the first power voltage VDDI may flow to the logic block 1110 through the first power line 1300, and the current may flow to the first IC ground IGND1 and the printed circuit board ground FGND in the logic block 1110. The second power voltage VCI may be applied to the analog block 1120 through the second power line 1400. A current generated by the second power voltage VCI may flow to the analog block 1120 through the second power line 1400, and the current may flow to the second IC ground IGND2 and the printed circuit board ground FGND through the analog block 1120.

Referring to FIG. 4, when the electrostatic discharge current ESD flows, the transient voltage suppressor diode 1220 may be in the turn-on state and the board switch 1230 may be in the turn-off state. Although the first power voltage VDDI and the second power voltage VCI are not illustrated in FIG. 4, the first power voltage VDDI and the second power voltage VCI may be applied to the first power line 1300 and the second power line 1400, respectively. The electrostatic discharge current ESD may flow into the printed circuit board ground FGND, and a large portion of the electrostatic discharge current ESD may flow to the transient voltage suppressor diode 1220. Accordingly, a permanent hard fail of ICs included in the logic block 1110 and the analog block 1120 may be prevented by the transient voltage suppressor diode 1220. If there is not the board switch 1230, a portion of the electrostatic discharge current ESD may flow to the first IC ground IGND1 and the second IC ground IGND2, so that the logic block 1110 may malfunction. However, since the board switch 1230 may prevent the electrostatic discharge current ESD from flowing to the first IC ground IGND1, an erroneous operation of the logic block 1110 may be effectively prevented.

Figure 5:
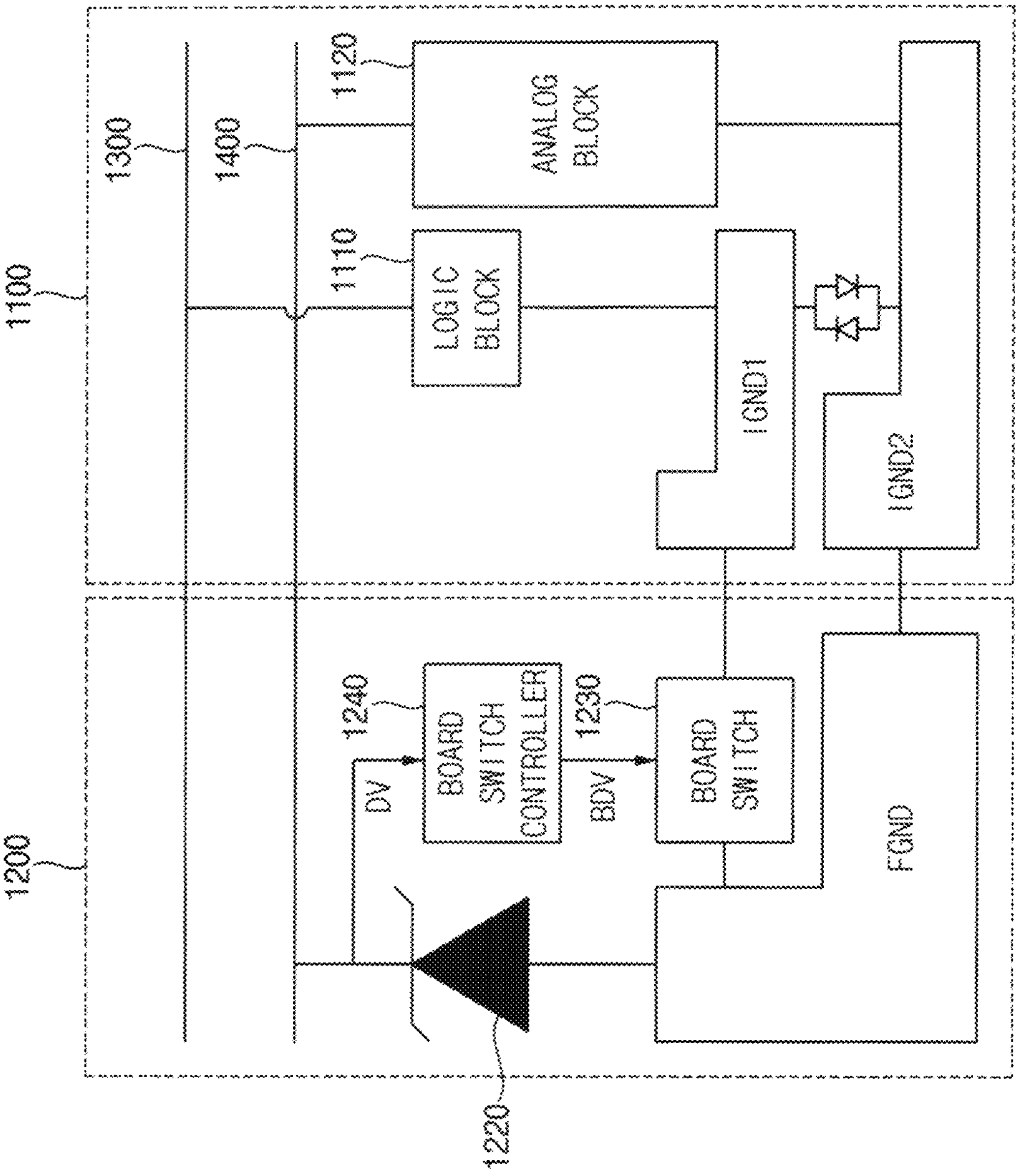
FIG. 5 is a diagram illustrating a display apparatus according to another embodiment of the present invention.
Figure 6:
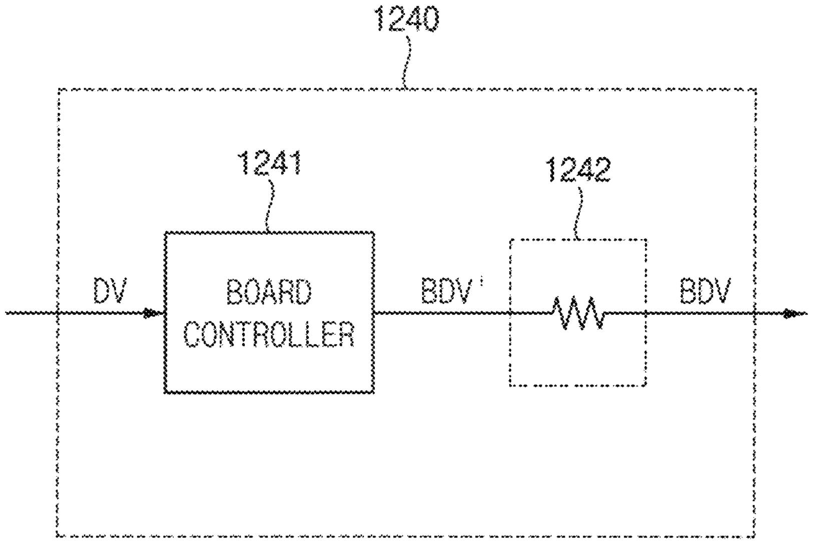
FIG. 6 is a diagram illustrating an example of a board switch controller of the display apparatus of FIG. 5.

FIG. 5 is a diagram illustrating a display apparatus according to another embodiment of the present invention, and FIG. 6 is a diagram illustrating an example of a board switch controller 1240 of the display apparatus of FIG. 5.

The display apparatus according to the present embodiment is substantially the same as the display apparatus 1000 of FIG. 1 except for the board switch controller 1240. Thus, the same reference numerals are used to refer to the same or similar element, and any repetitive explanation will be omitted.

Referring to FIG. 5, the printed circuit board region 1200 may further include the board switch controller 1240. According to an embodiment, the board switch controller 1240 may generate a board adjustment detection voltage BDV based on the detection voltage DV. According to an embodiment, the board switch 1230 may perform the switching operation based on the board adjustment detection voltage BDV. For example, the board switch controller 1240 may adjust the detection voltage DV by adjusting a timing and/or a duration of the switching operation performed by the board switch 1230. For example, when a different result than expected is obtained when the display apparatus is actually operated, the board switch 1230 may adjust the detection voltage DV to generate the board adjustment detection voltage BDV which has expected timing and duration. So, the board switch 1230 may block the electrostatic discharge current ESD more efficiently.

Referring to FIG. 6, according to an embodiment, the board switch controller 1240 may include a board controller 1241 and a board current control resistor 1242. The board controller 1241 may generate a temporary board adjustment detection voltage BDV' for adjusting the timing and/or the duration of the switching operation performed by the board switch 1230. The board current control resistor 1242 may reduce a current applied to the board switch 1230. Accordingly, the board adjustment detection voltage BDV may be lower than the temporary board adjustment detection voltage BDV'. As a result, it is possible to effectively prevent the board switch 1230 from being destroyed due to an overcurrent.

Figure 7:
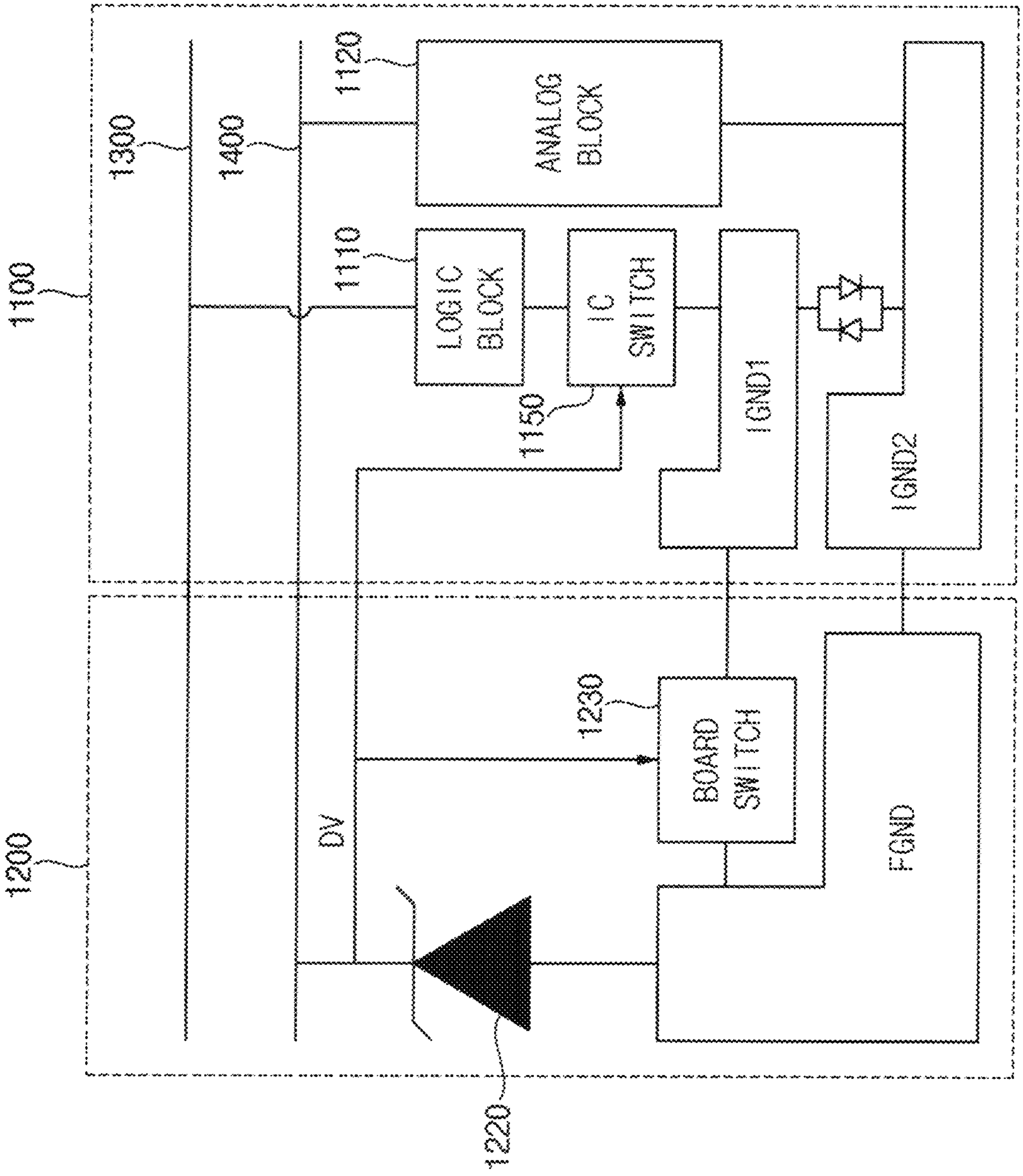
FIG. 7 is a diagram illustrating a display apparatus according to still another embodiment of the present invention.
Figure 8:
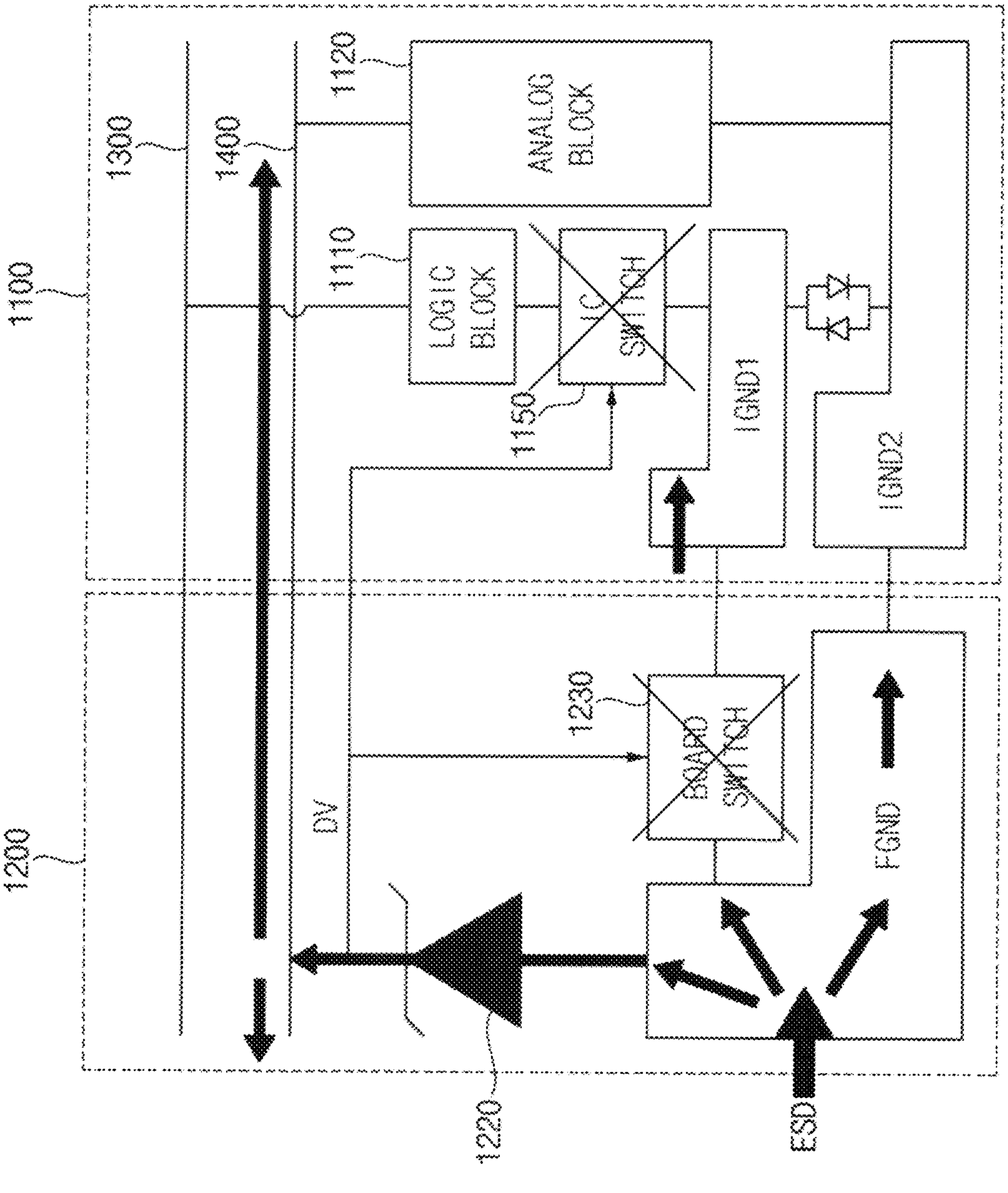
FIG. 8 is a diagram illustrating an example in which an electrostatic discharge current flows through the display apparatus of FIG. 7.

FIG. 7 is a diagram illustrating a display apparatus according to still another embodiment of present invention, and FIG. 8 is a diagram illustrating an example in which the electrostatic discharge current ESD flows through the display apparatus of FIG. 7.

The display apparatus according to the present embodiment is substantially the same as the display apparatus 1000 of FIG. 1 except for an IC switch 1150. Thus, the same reference numerals are used to refer to the same or similar element, and any repetitive explanation will be omitted.

Referring to FIG. 7, the IC region 1100 may further include the IC switch 1150 for performing a switching operation between the logic block 1110 and the first IC ground IGND1. The IC switch 1150 may perform the switching operation based on the detection voltage DV detected from the first electrode of the transient voltage suppressor diode 1220. For example, the IC switch 1150 may include an element capable of performing the high-speed switching operation. For example, the IC switch 1150 may include the inverter and the PMOS transistor. For example, the IC switch 1150 may be the high-speed relay. The operation of the IC switch 1150 will be described later.

Referring to FIG. 8, the IC switch 1150 may be in a turn-on state when the detection voltage DV is the same as the second power voltage VCI. The IC switch 1150 may be in a turn-off state when the electrostatic discharge current ESD flows.

For example, the IC switch 1150 may include an inverter to which the detection voltage DV is applied and a p-type transistor (e.g., PMOS transistor) including a control electrode connected to the inverter. In this case, when the electrostatic discharge current ESD does not flow, the IC switch 1150 may be turned on. When the electrostatic discharge current ESD flows, the electrostatic discharge current ESD flows to the dynamic resistance of the transient voltage suppressor diode 1220, so that the detection voltage DV may have a large negative voltage. Even though the dynamic resistance is low, the detection voltage DV may have the large negative voltage because of the high electrostatic discharge current ESD. By passing the large negative voltage through the inverter, the IC switch 1150 may be in the turn-off state.

For example, the IC switch 1150 may be the high-speed relay. The high-speed relay may be in a turn-off state when the detection voltage DV is changed to be greater than the preset reference voltage. The reference voltage may be greater than the second power voltage VCI. Accordingly, when the electrostatic discharge current ESD does not flow, the IC switch 1150 may be in the turn-on state. When the electrostatic discharge current ESD flows, the electrostatic discharge current ESD flows through the dynamic resistance of the transient voltage suppressor diode 1220, so that the detection voltage DV may be changed to be greater than the reference voltage. Due to this, the IC switch 1150 may be in the turn-off state.

Referring to FIG. 8, when the electrostatic discharge current ESD flows, the transient voltage suppressor diode 1220 may be in a turn-on state and the board switch 1230 and the IC switch 1150 may be in the turn-off state. Although the first power voltage VDDI and the second power voltage VCI are not illustrated in FIG. 8, the first power voltage VDDI and the second power voltage VCI may be applied to the first power line 1300 and the second power line 1400, respectively. The electrostatic discharge current ESD may flow into the printed circuit board ground FGND, and a large portion of the electrostatic discharge current ESD may flow to the transient voltage suppressor diode 1220. Accordingly, a permanent hard fail of ICs included in the logic block 1110 and the analog block 1120 may be prevented by the transient voltage suppressor diode 1220. If there is not the board switch 1230, a portion of the electrostatic discharge current ESD may flow to the first IC ground IGND1 and the second IC ground IGND2, so that the logic block 1110 may malfunction. If there is not the IC switch 1150, a portion of the electrostatic discharge current ESD may flow to the logic block 1110, so that the logic block 1110 may malfunction. However, since the board switch 1230 may prevent the electrostatic discharge current ESD from flowing to the first IC ground IGND1, the erroneous operation of the logic block 1110 may be effectively prevented. In addition, since the IC switch 1150 may prevent the electrostatic discharge current ESD that has not been blocked by the board switch 1230 from flowing to the logic block 1110, the erroneous operation of the logic block 1110 may be prevented.

Figure 9:
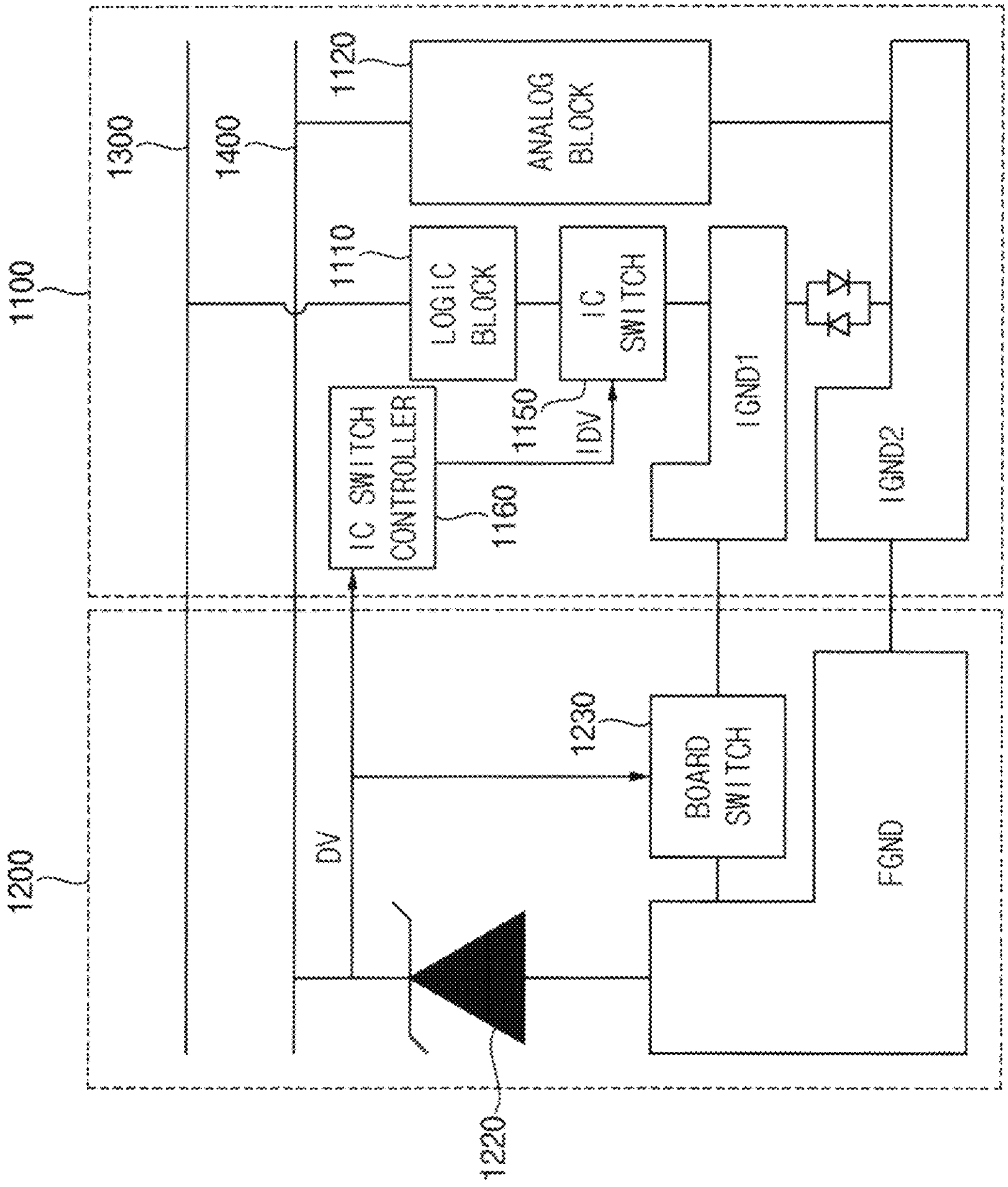
FIG. 9 is a diagram illustrating a display apparatus according to yet another embodiment of the present invention.
Figure 10:
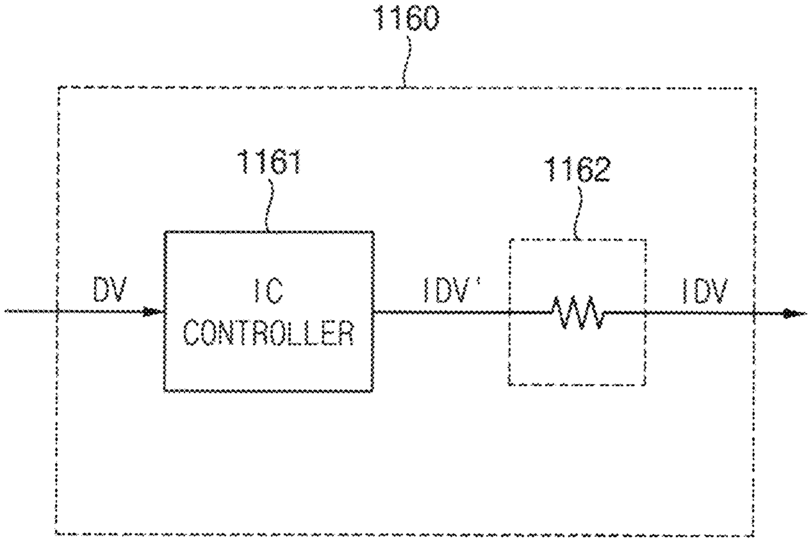
FIG. 10 is a diagram illustrating an IC switch controller of the display apparatus of FIG. 9.

FIG. 9 is a diagram illustrating a display apparatus according to yet another embodiment of the present invention, and FIG. 10 is a diagram illustrating an IC switch controller 1160 of the display apparatus of FIG. 9.

The display apparatus according to the present embodiment is substantially the same as the display apparatus 1000 of FIG. 1 except for the IC switch controller 1160. Thus, the same reference numerals are used to refer to the same or similar element, and any repetitive explanation will be omitted.

Referring to FIG. 9, the IC region 1100 may further include the IC switch controller 1160. According to an embodiment, the IC switch controller 1160 may generate the IC adjustment detection voltage IDV based on the detection voltage DV. According to an embodiment, the IC switch 1150 may perform the switching operation based on the IC adjustment detection voltage IDV. For example, the IC switch controller 1160 may adjust the detection voltage DV by adjusting a timing and/or a duration of the switching operation performed by the IC switch 1150. For example, when a different result than expected is obtained when the display apparatus is actually operated, the IC switch 1150 may adjust the detection voltage DV to generate the IC adjustment detection voltage IDV. So, the IC switch 1150 may block the electrostatic discharge current ESD more efficiently.

Referring to FIG. 10, according to an embodiment, the IC switch controller 1160 may include an IC controller 1161 and an IC current control resistor 1162. The IC controller 1161 may generate a temporary IC adjustment detection voltage IDV' for adjusting the timing and/or the duration of the switching operation performed by the IC switch 1150. The IC current control resistor 1162 may reduce a current applied to the IC switch 1150. Accordingly, the IC adjustment detection voltage IDV may be lower than the temporary IC adjustment detection voltage IDV'. As a result, it is possible to effectively prevent the IC switch 1150 from being destroyed due to an overcurrent.

Figure 11:
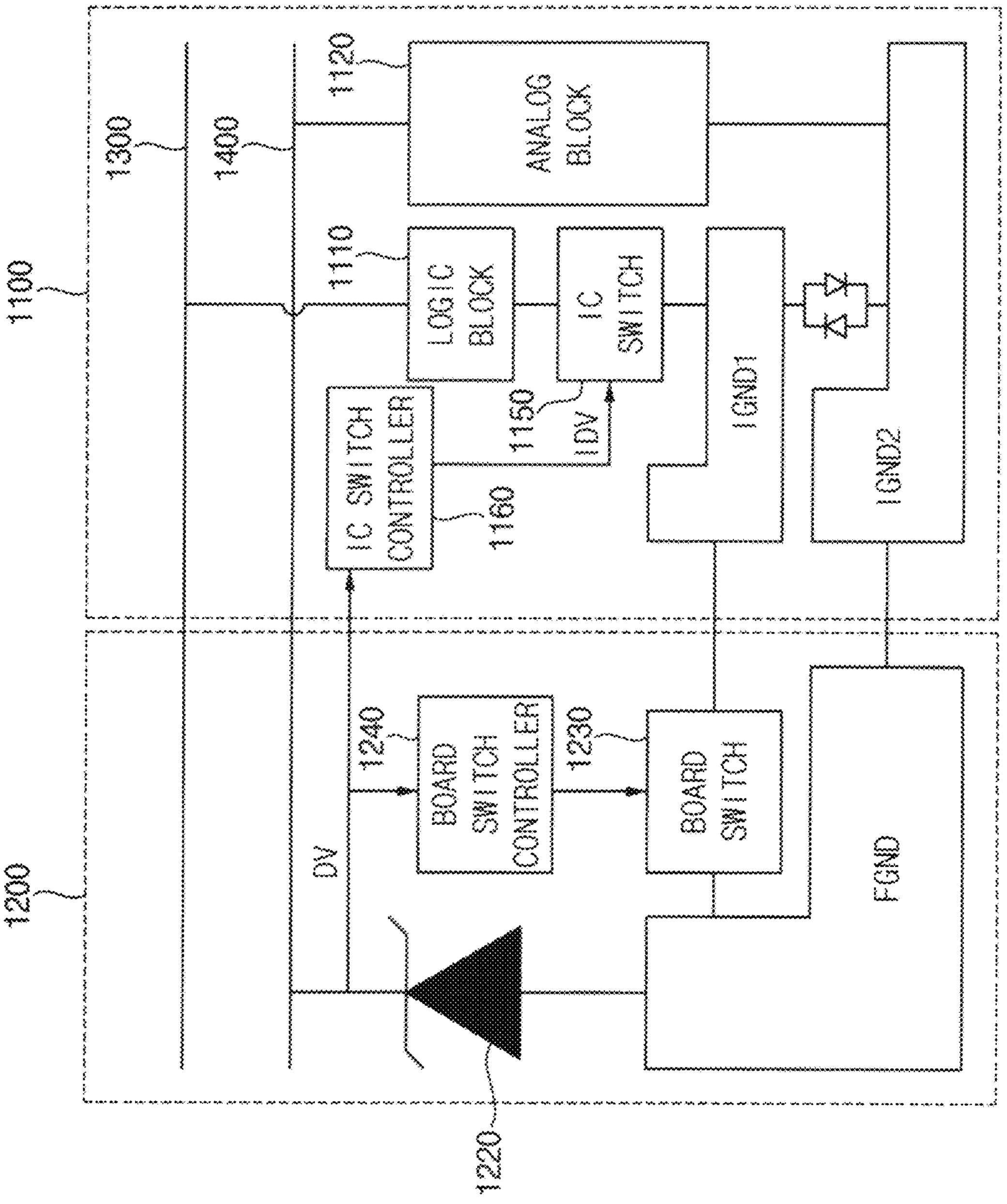
FIG. 11 is a diagram illustrating a display apparatus according to another embodiment of the present invention.

FIG. 11 is a diagram illustrating a display apparatus according to another embodiment of the present invention.

The display apparatus according to the present embodiment is substantially the same as the display apparatus of FIG. 9 except for the board switch controller 1240. Thus, the same reference numerals are used to refer to the same or similar element, and any repetitive explanation will be omitted.

Referring to FIG. 11, the printed circuit board region 1200 may further include the board switch controller 1240. According to an embodiment, the board switch controller 1240 may generate a board adjustment detection voltage BDV based on the detection voltage DV. According to an embodiment, the board switch 1230 may perform the switching operation based on the board adjustment detection voltage BDV. For example, the board switch controller 1240 may adjust the detection voltage DV by adjusting a timing and/or a duration of the switching operation performed by the board switch 1230. For example, when a different result than expected is obtained when the display apparatus is actually operated, the board switch 1230 may adjust the detection voltage DV to generate the board adjustment detection voltage BDV. So, the board switch 1230 may block the electrostatic discharge current ESD more efficiently.

Figure 12:
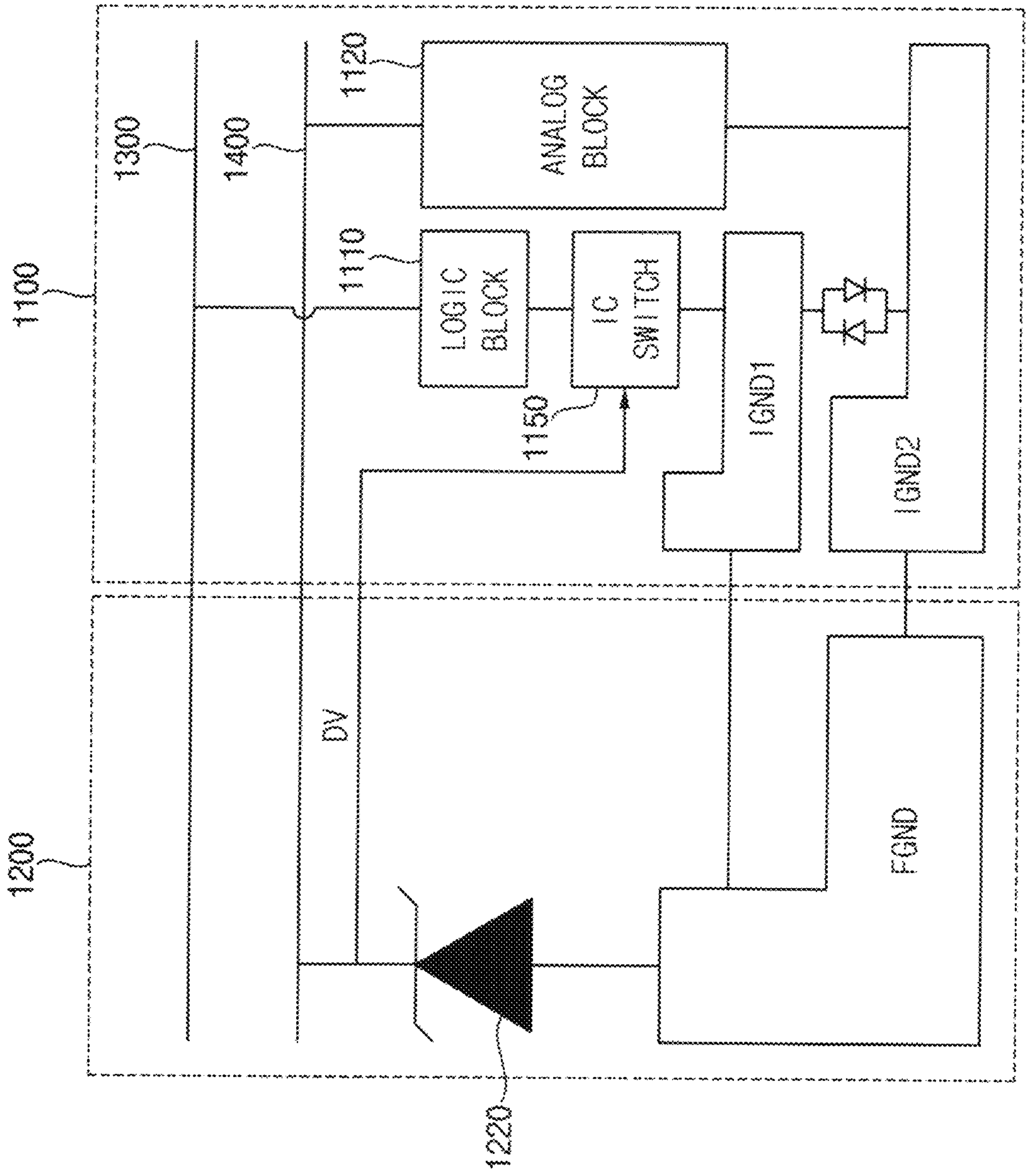
FIG. 12 is a diagram illustrating a display apparatus according to still another embodiment of the present invention.
Figure 13:
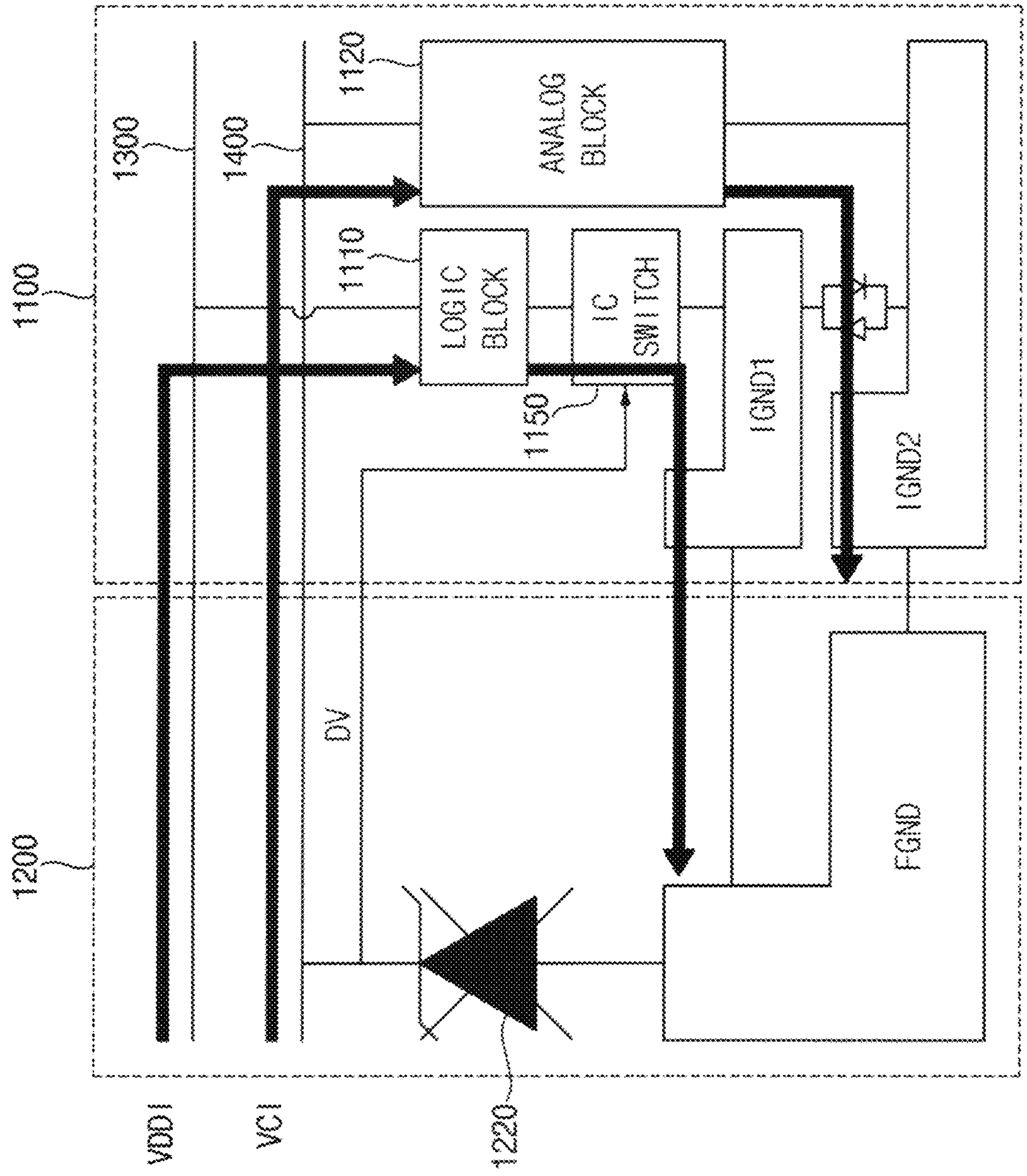
FIG. 13 is a diagram illustrating an example in which a first power voltage and a second power voltage flow through the display apparatus of FIG. 12.
Figure 14:
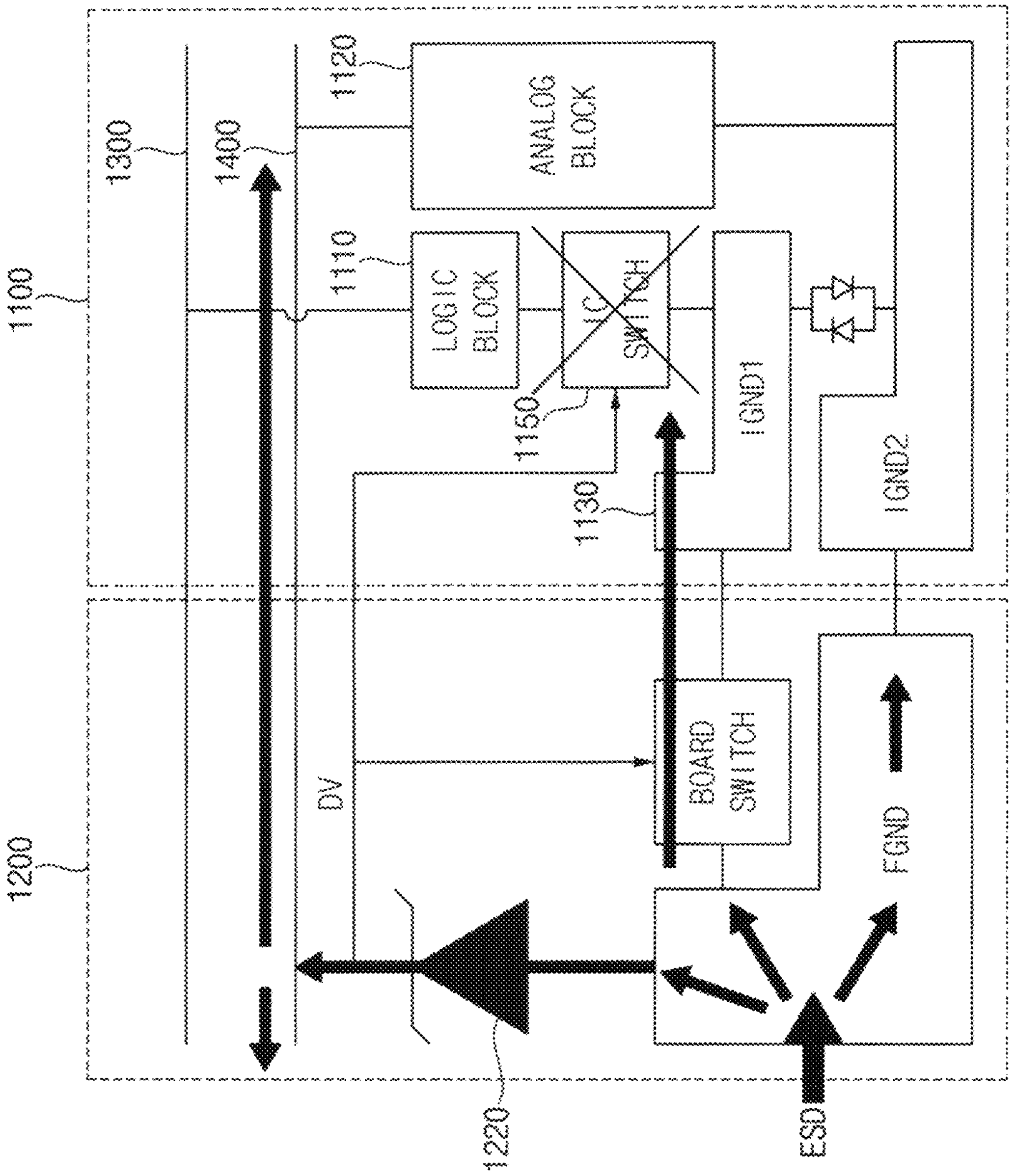
FIG. 14 is a diagram illustrating an example in which an electrostatic discharge current flows through the display apparatus of FIG. 12.

FIG. 12 is a diagram illustrating a display apparatus according to still another embodiment of the present invention, and FIG. 13 is a diagram illustrating an example in which the first power voltage VDDI and the second power voltage VCI flow through the display apparatus of FIG. 12. Specifically, FIG. 13 illustrates an example in which the first power voltage VDDI and the second power voltage VCI flow through the display apparatus of FIG. 12 when the electrostatic discharge current ESD does not flow through the display apparatus of FIG. 12. FIG. 14 is a diagram illustrating an example in which the electrostatic discharge current ESD flows through the display apparatus of FIG. 12.

Referring to FIGS. 12 to 14, the display apparatus of FIG. 12 may include the IC region 1100, the printed circuit board region 1200, the first power line 1300, and the second power line 1400.

The IC region 1100 may include the logic block 1110, the analog block 1120, the first IC ground IGND1, and the second IC ground IGND2.

The logic block 1110 may receive the first power voltage VDDI from the first power line 1300. The logic block 1110 may be a block including a logic circuit. For example, the logic block 1110 may be a block in which an arbitrary setting value is stored. For example, the logic block 1110 may be a block for performing register setting. For example, the logic block 1110 may be a block including a memory. For example, when the IC region 1100 is mounted in a chip-on-film (COF) method, the logic block 1110 may be a block including a test circuit. The logic block 1110 may be sensitive to shaking of the first IC ground IGND1. When the value calculated by the logic block 1110 is changed by a soft fail due to the shaking, overall driving of the display apparatus 1000 may be affected.

The analog block 1120 may receive the second power voltage VCI from the second power line 1400. The analog block 1120 may include a circuit in which analog data are used. For example, the analog block 1120 may be a block including a circuit for converting the data signal DATA into an analog voltage type. For example, the analog block 1120 may include a buffer included in the data driver 400. Since the analog block 1120 does not store any value, a defect of the analog block 1120 may not be fixed even when an erroneous operation occurs.

The first IC ground IGND1 may be connected to the logic block 1110. The second IC ground IGND2 may be connected to the analog block 1120. The first IC ground IGND1 and the second IC ground IGND2 may have the same electric potential. The first IC ground IGND1 and the second IC ground IGND2 may be connected to each other by two diodes disposed in opposite directions.

the IC region 1100 may further include the IC switch 1150 performing the switching operation between the logic block 1110 and the first IC ground IGND1. The IC switch may perform the switching operation based on the detection voltage DV detected from the first electrode of the transient voltage suppressor diode 1220. For example, the IC switch 1150 may include an element capable of performing the high-speed switching operation. For example, the IC switch 1150 may include the inverter and the PMOS transistor. For example, the IC switch 1150 may be the high-speed relay.

The printed circuit board region 1200 may include the printed circuit board ground FGND and the transient voltage suppressor diode 1220.

The printed circuit board ground FGND may be connected to the first IC ground IGND1 and the second IC ground IGND2. The printed circuit board ground FGND may have an electric potential same as the electric potential of the first IC ground IGND1 and the electric potential of the second IC ground IGND2. For example, the printed circuit board ground FGND may be connected to the first IC ground IGND1 and the second IC ground IGND2 through a plurality of pins.

The transient voltage suppressor diode 1220 may include a first electrode connected to the second power line 1400 and a second electrode connected to the printed circuit board ground FGND.

The first power voltage VDDI may be applied to the first power line 1300. The second power voltage VCI may be applied to the second power line 1400. In an embodiment, the first power voltage VDDI may be less than the second power voltage VCI. For example, since the first power voltage VDDI is applied to the logic block 1110 including the logic circuit, the first power voltage VDDI may be less than the second power voltage VCI.

Referring to FIG. 13, the transient voltage suppressor diode 1220 may be in a turn-on state when the electrostatic discharge current ESD flows, and may be in a turn-off state when the electrostatic discharge current ESD does not flow. The IC switch 1150 may be in a turn-on state when the detection voltage DV is the same as the second power voltage VCI. The IC switch 1150 may be in a turn-off state when the electrostatic discharge current ESD flows.

For example, the IC switch 1150 may include an inverter to which the detection voltage DV is applied and a p-type transistor including a control electrode connected to the inverter. In this case, when the electrostatic discharge current ESD does not flow, the IC switch 1150 may be turned on. When the electrostatic discharge current ESD flows, the electrostatic discharge current ESD flows to the dynamic resistance of the transient voltage suppressor diode 1220, so that the detection voltage DV may have a large negative voltage. Even though the dynamic resistance is low, the detection voltage DV may have the large negative voltage because of the high electrostatic discharge current ESD. By passing the large negative voltage through the inverter, the IC switch 1150 may be in the turn-off state.

For example, the IC switch 1150 may be the high-speed relay. The high-speed relay may be in a turn-off state when the detection voltage DV is changed to be greater than the preset reference voltage. The reference voltage may be greater than the second power voltage VCI. Accordingly, when the electrostatic discharge current ESD does not flow, the IC switch 1150 may be in the turn-on state. When the electrostatic discharge current ESD flows, the electrostatic discharge current ESD flows through the dynamic resistance of the transient voltage suppressor diode 1220, so that the detection voltage DV may be changed to be greater than the reference voltage. Due to this, the IC switch 1150 may be in the turn-off state.

Referring to FIG. 13, when the electrostatic discharge current ESD does not flow, the transient voltage suppressor diode 1220 may be in the turn-off state and the IC switch 1150 may be in the turn-on state. The first power voltage VDDI may be applied to the logic block 1110 through the first power line 1300. A current generated by the first power voltage VDDI may flow to the logic block 1110 through the first power line 1300, and the current may flow to the first IC ground IGND1 and the printed circuit board ground FGND in the logic block 1110. The second power voltage VCI may be applied to the analog block 1120 through the second power line 1400. A current generated by the second power voltage VCI may flow to the analog block 1120 through the second power line 1400, and the current may flow to the second IC ground IGND2 and the printed circuit board ground FGND through the analog block 1120.

Referring to FIG. 14, when the electrostatic discharge current ESD flows, the transient voltage suppressor diode 1220 may be in the turn-on state and the IC switch 1150 may be in the turn-off state. Although the first power voltage VDDI and the second power voltage VCI are not illustrated in FIG. 14, the first power voltage VDDI and the second power voltage VCI may be applied to the first power line 1300 and the second power line 1400, respectively. The electrostatic discharge current ESD may flow into the printed circuit board ground FGND, and a large portion of the electrostatic discharge current ESD may flow to the transient voltage suppressor diode 1220. Accordingly, the permanent hard fail of ICs included in the logic block 1110 and the analog block 1120 may be effectively prevented by the transient voltage suppressor diode 1220. If there is not the IC switch 1150, a portion of the electrostatic discharge current ESD may flow to the logic block 1110, so that the logic block 1110 may malfunction. However, since the IC switch 1150 may prevent the electrostatic discharge current ESD from flowing to the logic block 1110, the erroneous operation of the logic block 1110 may be effectively prevented.

Figure 15:
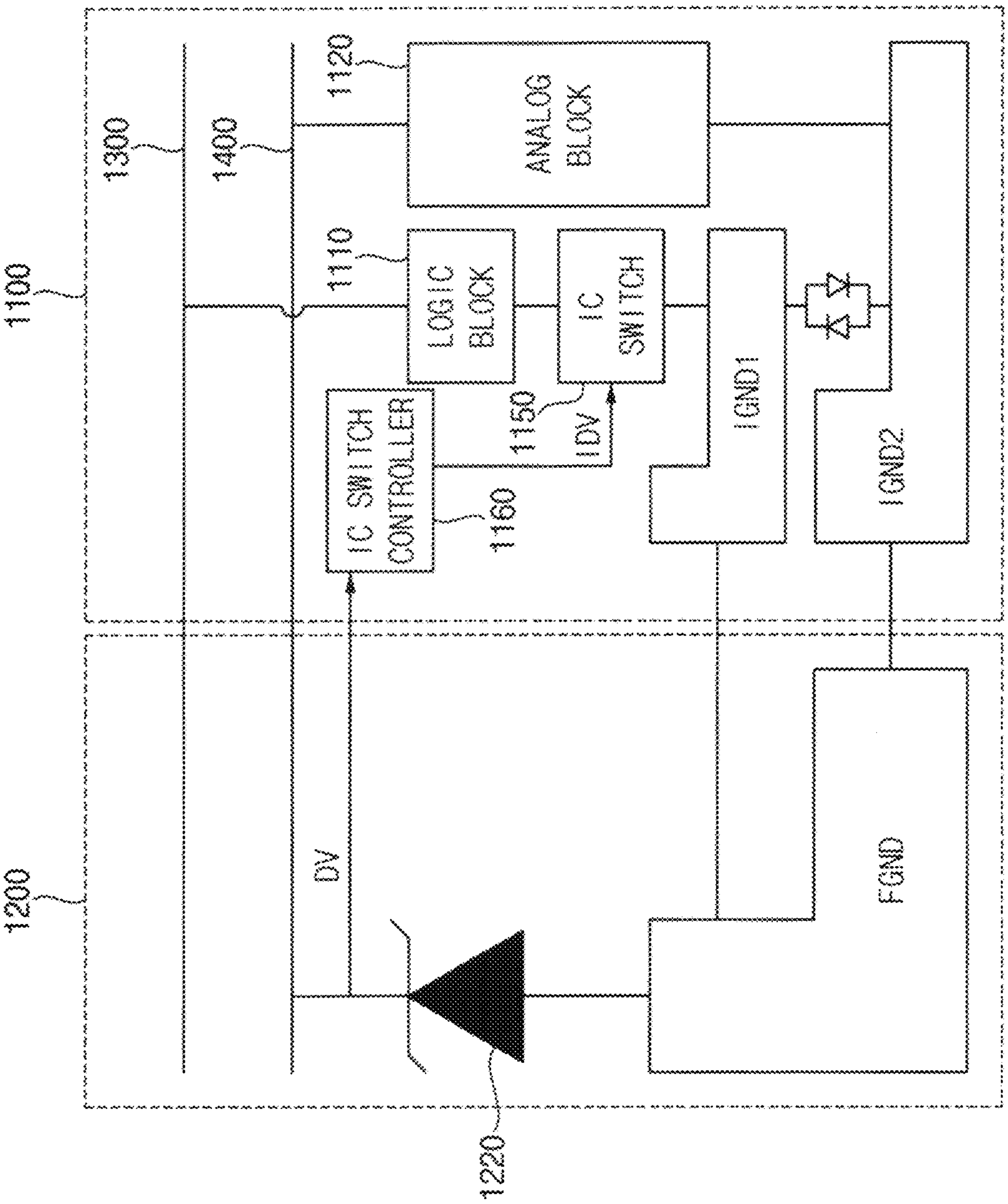
FIG. 15 is a diagram illustrating a display apparatus according to yet another embodiment of the present invention.

FIG. 15 is a diagram illustrating a display apparatus according to yet another embodiment of the present invention.

The display apparatus according to the present embodiment is substantially the same as the display apparatus of FIG. 12 except for the IC switch controller 1160. Thus, the same reference numerals are used to refer to the same or similar element, and any repetitive explanation will be omitted.

Referring to FIG. 15, the IC region 1100 may further include the IC switch controller 1160. According to an embodiment, the IC switch controller 1160 may generate the IC adjustment detection voltage IDV based on the detection voltage DV. According to an embodiment, the IC switch 1150 may perform the switching operation based on the IC adjustment detection voltage IDV. For example, the IC switch controller 1160 may adjust the detection voltage DV by adjusting a timing and/or a duration of the switching operation performed by the IC switch 1150. For example, when a different result than expected is obtained when the display apparatus is actually operated, the IC switch 1150 may adjust the detection voltage DV to generate the IC adjustment detection voltage IDV. So, the IC switch 1150 may block the electrostatic discharge current ESD more efficiently.

Figure 16:
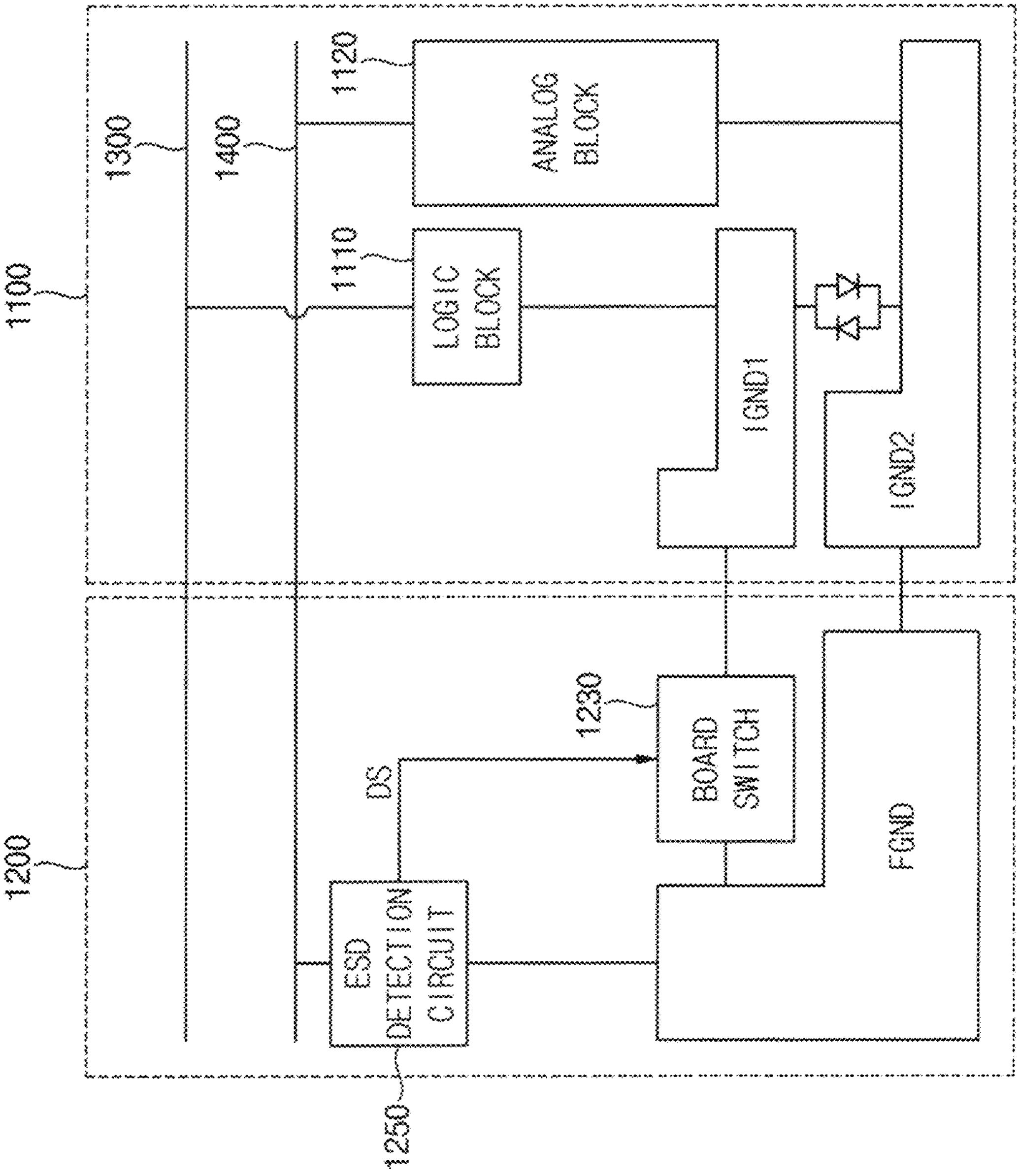
FIG. 16 is a diagram illustrating a display apparatus according to another embodiment of the present invention.
Figure 17:
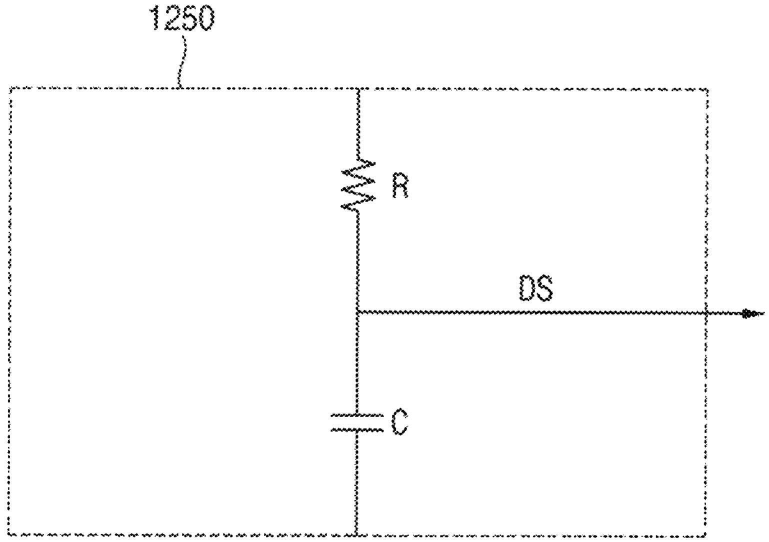
FIG. 17 is a diagram illustrating an example of an ESD detection circuit of the display apparatus of FIG. 16.
Figure 18:
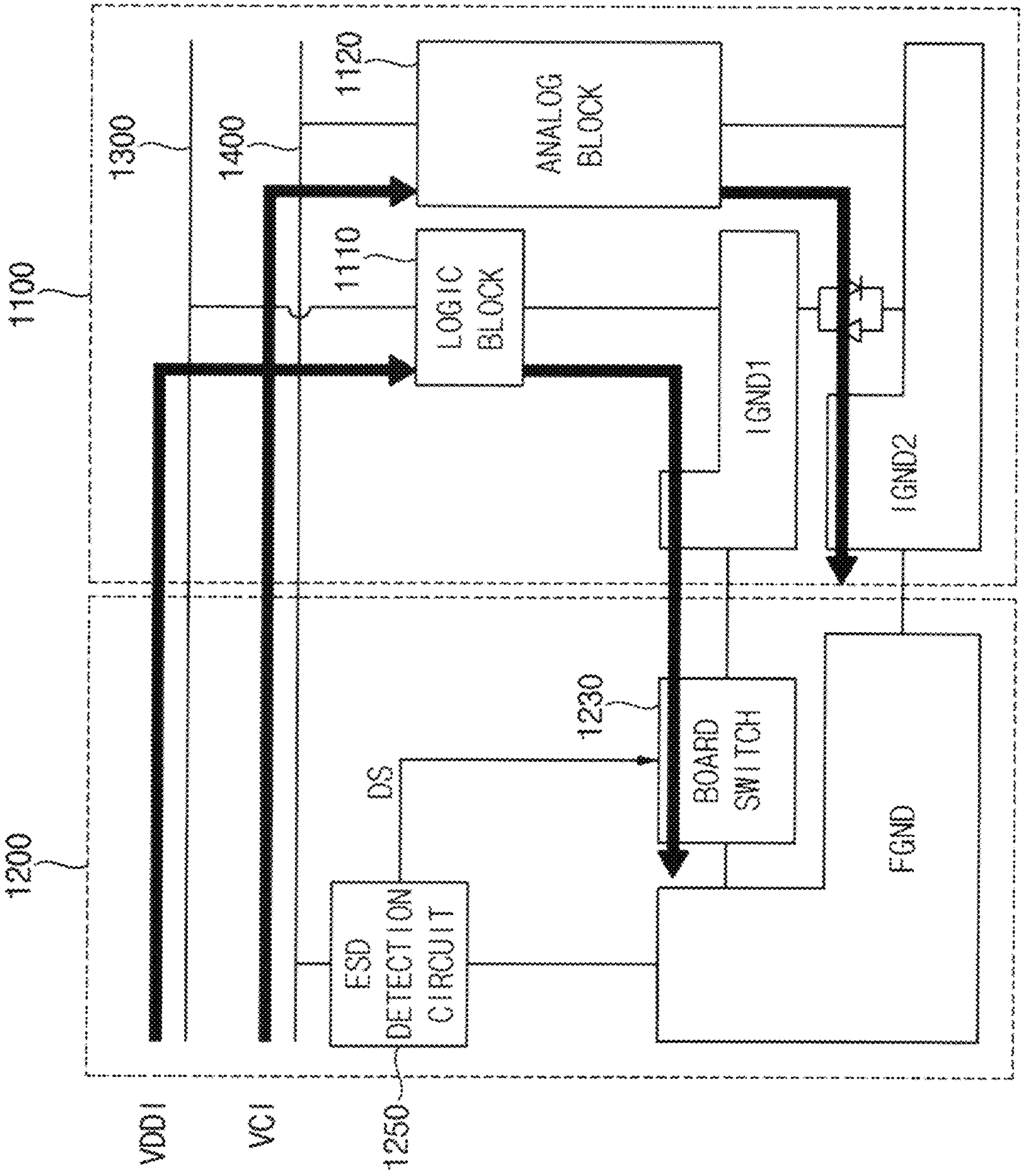
FIG. 18 is a diagram illustrating an example in which a first power voltage and a second power voltage flow through the display apparatus of FIG. 16.
Figure 19:
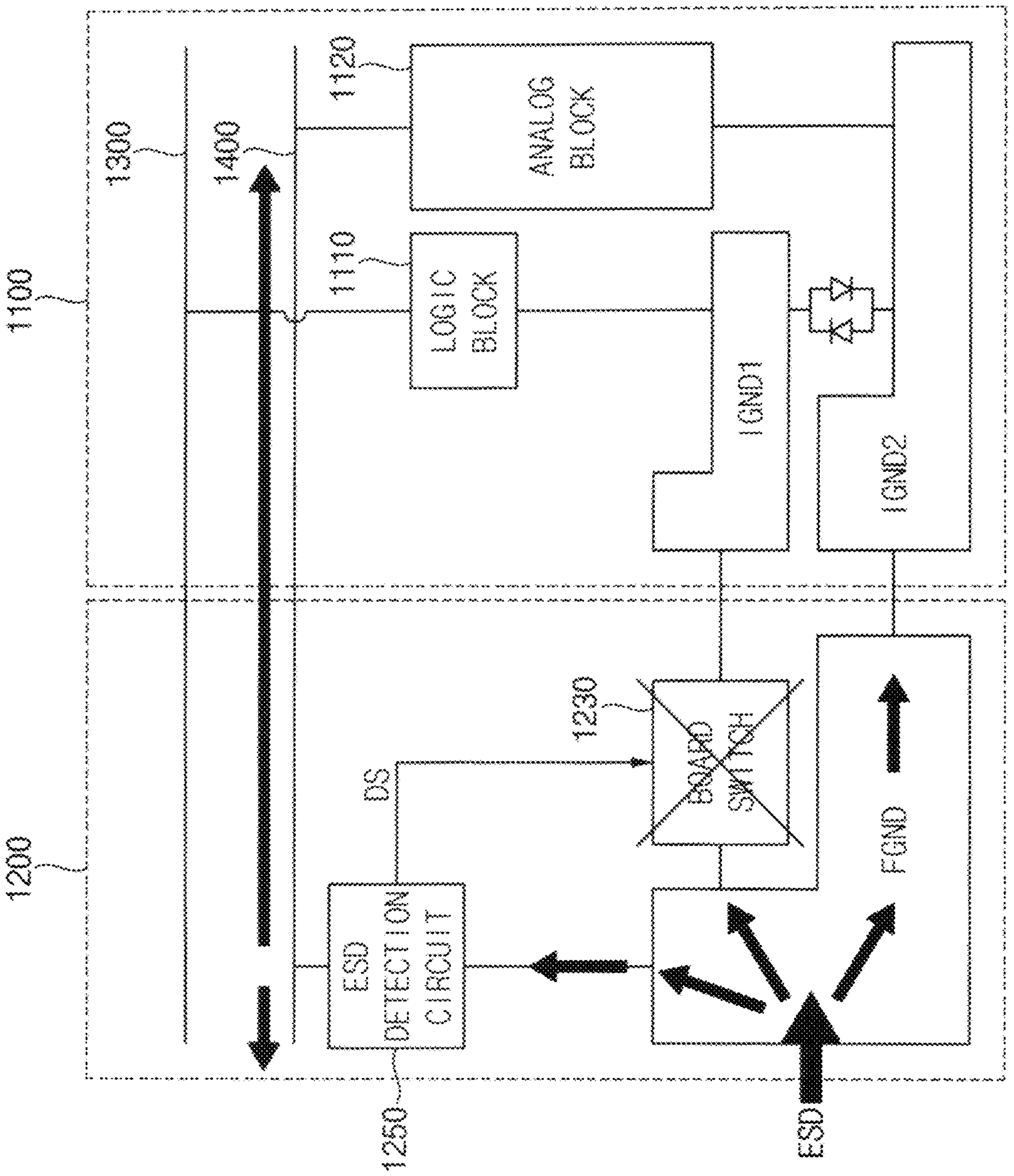
FIG. 19 is a diagram illustrating an example in which an electrostatic discharge current flows through the display apparatus of FIG. 16.

FIG. 16 is a diagram illustrating a display apparatus according to another embodiment, FIG. 17 is a diagram illustrating an example of an ESD detection circuit 1250 of the display apparatus of FIG. 16, FIG. 18 is a diagram illustrating an example in which the first power voltage VDDI and the second power voltage VCI flow through the display apparatus of FIG. 16. Specifically, FIG. 18 illustrates an example in which the first power voltage VDDI and the second power voltage VCI flow through the display apparatus of FIG. 16 when the electrostatic discharge current ESD does not flow through the display apparatus of FIG. 16. FIG. 19 is a diagram illustrating an example in which the electrostatic discharge current ESD flows through the display apparatus of FIG. 16.

The display apparatus according to the present embodiment is substantially the same as the display apparatus 1000 of FIG. 1 except for the printed circuit board region 1200. Thus, the same reference numerals are used to refer to the same or similar element, and any repetitive explanation will be omitted.

Referring to FIG. 16, the display apparatus of FIG. 16 may include the IC region 1100, the printed circuit board region 1200, a first power line 1300, and a second power line 1400.

The printed circuit board region 1200 may include a printed circuit board ground FGND, the ESD detection circuit 1250, and a board switch 1230.

The printed circuit board ground FGND may be connected to the first IC ground IGND1 and the second IC ground IGND2. The printed circuit board ground FGND may have an electric potential same as the electric potential of the first IC ground IGND1 and the electric potential of the second IC ground IGND2. For example, the printed circuit board ground FGND may be connected to the first IC ground IGND1 and the second IC ground IGND2 through a plurality of pins.

The ESD detection circuit 1250 may include a first electrode connected to the second power line 1400 and a second electrode connected to the printed circuit board ground FGND. The operation of the ESD detection circuit 1250 will be described later.

The board switch 1230 may perform the switching operation between the printed circuit board ground FGND and the first IC ground IGND1. The board switch 1230 may perform the switching operation based on the detection signal DS of the ESD detection circuit 1250. For example, the board switch 1230 may include an element capable of performing the high-speed switching operation. For example, the board switch 1230 may include an inverter and a PMOS transistor. For example, the board switch 1230 may be a high-speed relay.

Referring to FIG. 17, the ESD detection circuit 1250 may include a detection resistor element R and a detection capacitor element C. According to an embodiment, in the ESD detection circuit 1250, the detection resistor element R and the detection capacitor element C may be connected in series. The ESD detection circuit 1250 may output the detection signal DS when the electrostatic discharge current ESD is generated. For example, when the electrostatic discharge current ESD instantaneously flow through the printed circuit board ground FGND, the detection signal DS may be generated by the detection capacitor element C. In FIG. 17, the detection capacitor element C is connected to the printed circuit board ground FGND, but this is only an example. According to an embodiment, when the detection capacitor element C is connected to the second power line 1400, the ESD detection circuit 1250 may detect the electrostatic discharge current ESD flowing through the second power line 1400.

Referring to FIGS. 18 and 19, the board switch 1230 may be in a turn-off state when receiving the detection signal DS. The board switch 1230 may be in a turn-on state when the detection signal DS is not applied and a voltage less than or equal to the second power voltage VCI is received.

For example, the board switch 1230 may be a p-type transistor including a control electrode receiving the detection signal DS. In this case, when the electrostatic discharge current ESD does not flow, the board switch 1230 may be turned on. When the electrostatic discharge current ESD flows, the detection signal DS may have a high voltage value. Accordingly, the board switch 1230 may be in the turn-off state.

For example, the board switch 1230 may be the high-speed relay. The high-speed relay may be in a turn-off state when the detection signal DS is changed to be greater than the preset reference voltage. The reference voltage may be greater than the second power voltage VCI. Accordingly, when the electrostatic discharge current ESD does not flow, the board switch 1230 may be in the turn-on state. When the electrostatic discharge current ESD flows, the detection signal DS may be changed to be greater than the reference voltage. Due to this, the board switch 1230 may be in the turn-off state.

Referring to FIG. 18, when the electrostatic discharge current ESD does not flow, the board switch 1230 may be in the turn-on state. The first power voltage VDDI may be applied to the logic block 1110 through the first power line 1300. A current generated by the first power voltage VDDI may flow to the logic block 1110 through the first power line 1300, and the current may flow to the first IC ground IGND1 and the printed circuit board ground FGND in the logic block 1110. The second power voltage VCI may be applied to the analog block 1120 through the second power line 1400. A current generated by the second power voltage VCI may flow to the analog block 1120 through the second power line 1400, and the current may flow to the second IC ground IGND2 and the printed circuit board ground FGND through the analog block 1120.

Referring to FIG. 19, when the electrostatic discharge current ESD flows, the board switch 1230 may be in the turn-on state. Although the first power voltage VDDI and the second power voltage VCI are not illustrated in FIG. 19, the first power voltage VDDI and the second power voltage VCI may be applied to the first power line 1300 and the second power line 1400, respectively. If there is not the board switch 1230, a portion of the electrostatic discharge current ESD may flow to the first IC ground IGND1 and the second IC ground IGND2, so that the logic block 1110 may malfunction. However, since the board switch 1230 may prevent the electrostatic discharge current ESD from flowing to the first IC ground IGND1, the erroneous operation of the logic block 1110 may be effectively prevented.

Figure 20:
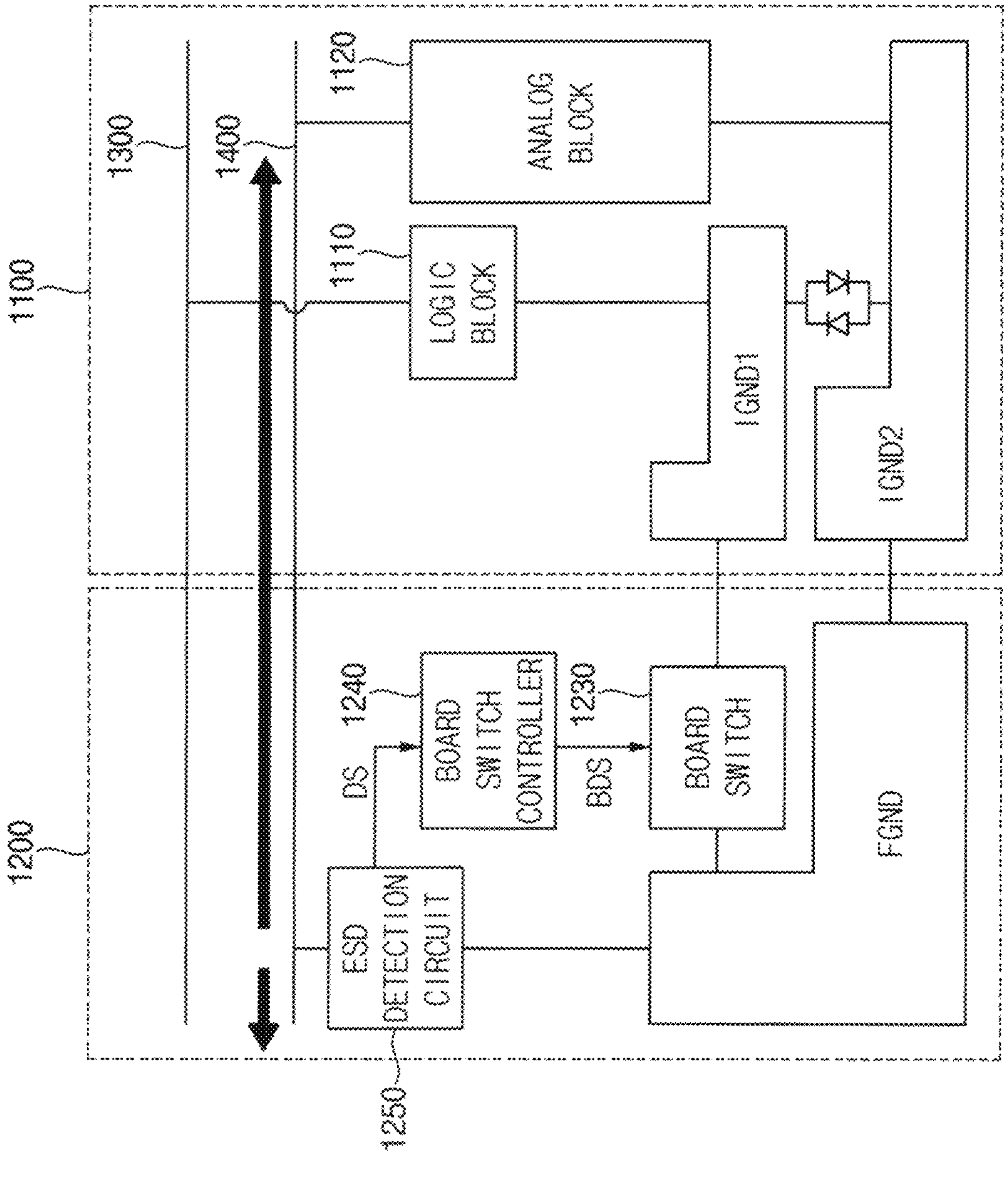
FIG. 20 is a diagram illustrating a display apparatus according to still another embodiment of the present invention.

FIG. 20 is a diagram illustrating a display apparatus according to still another embodiment of the present invention.

The display apparatus according to the present embodiment is substantially the same as the display apparatus of FIG. 16 except for the board switch controller 1240. Thus, the same reference numerals are used to refer to the same or similar element, and any repetitive explanation will be omitted.

Referring to FIG. 20, the printed circuit board region 1200 may further include the board switch controller 1240. According to an embodiment, the board switch controller 1240 may generate a board adjustment detection signal BDS based on the detection signal DS. According to an embodiment, the board switch 1230 may perform the switching operation based on the board adjustment detection signal BDS. For example, the board switch controller 1240 may adjust the detection signal DS by adjusting a timing and/or a duration of the switching operation performed by the board switch 1230. For example, when a different result than expected is obtained when the display apparatus is actually operated, the board switch 1230 may adjust the detection signal DS to generate the board adjustment detection signal BDS. So, the board switch 1230 may block the electrostatic discharge current ESD more efficiently.

Figure 21:
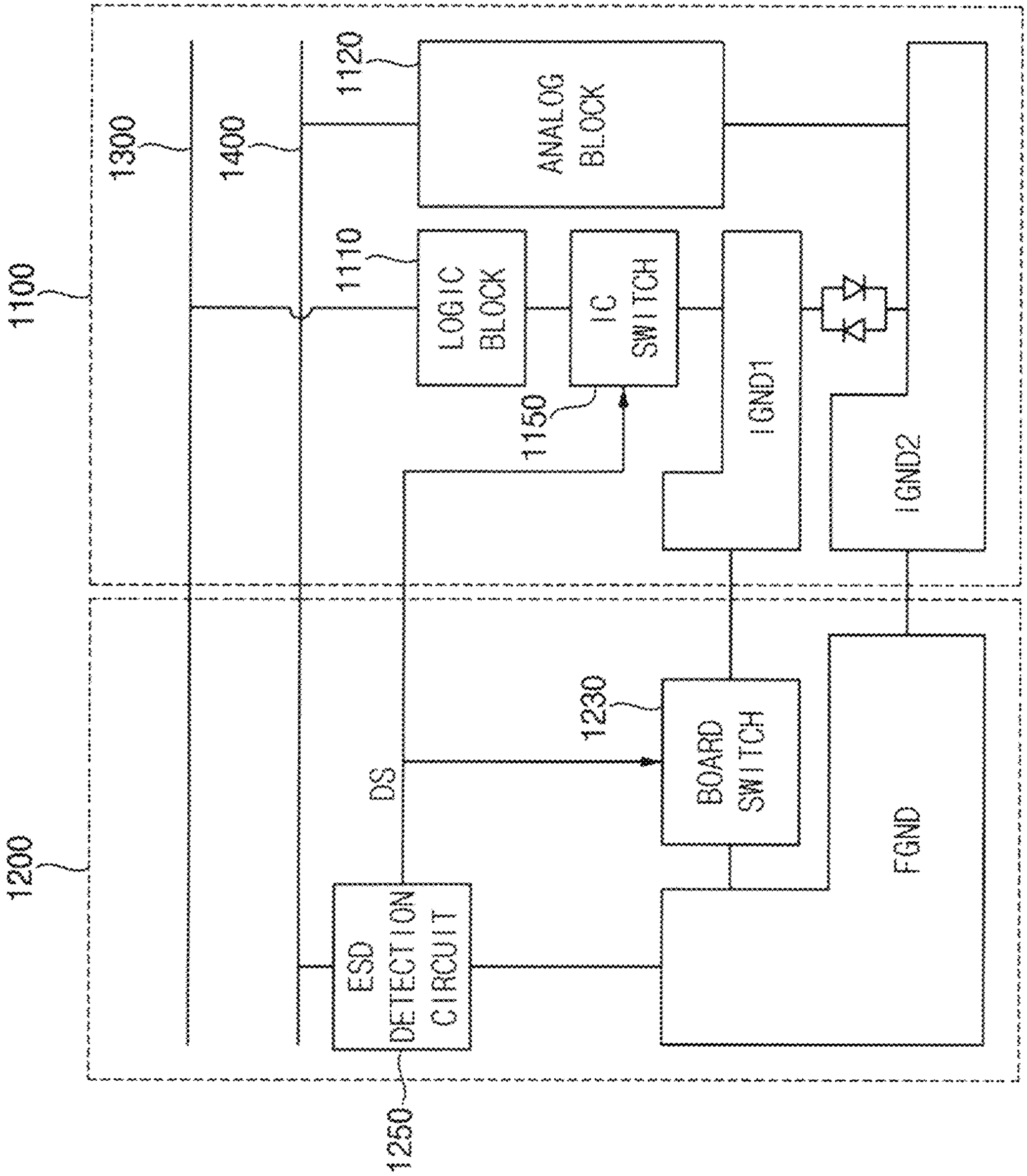
FIG. 21 is a diagram illustrating a display apparatus according to yet another embodiment of the present invention.
Figure 22:
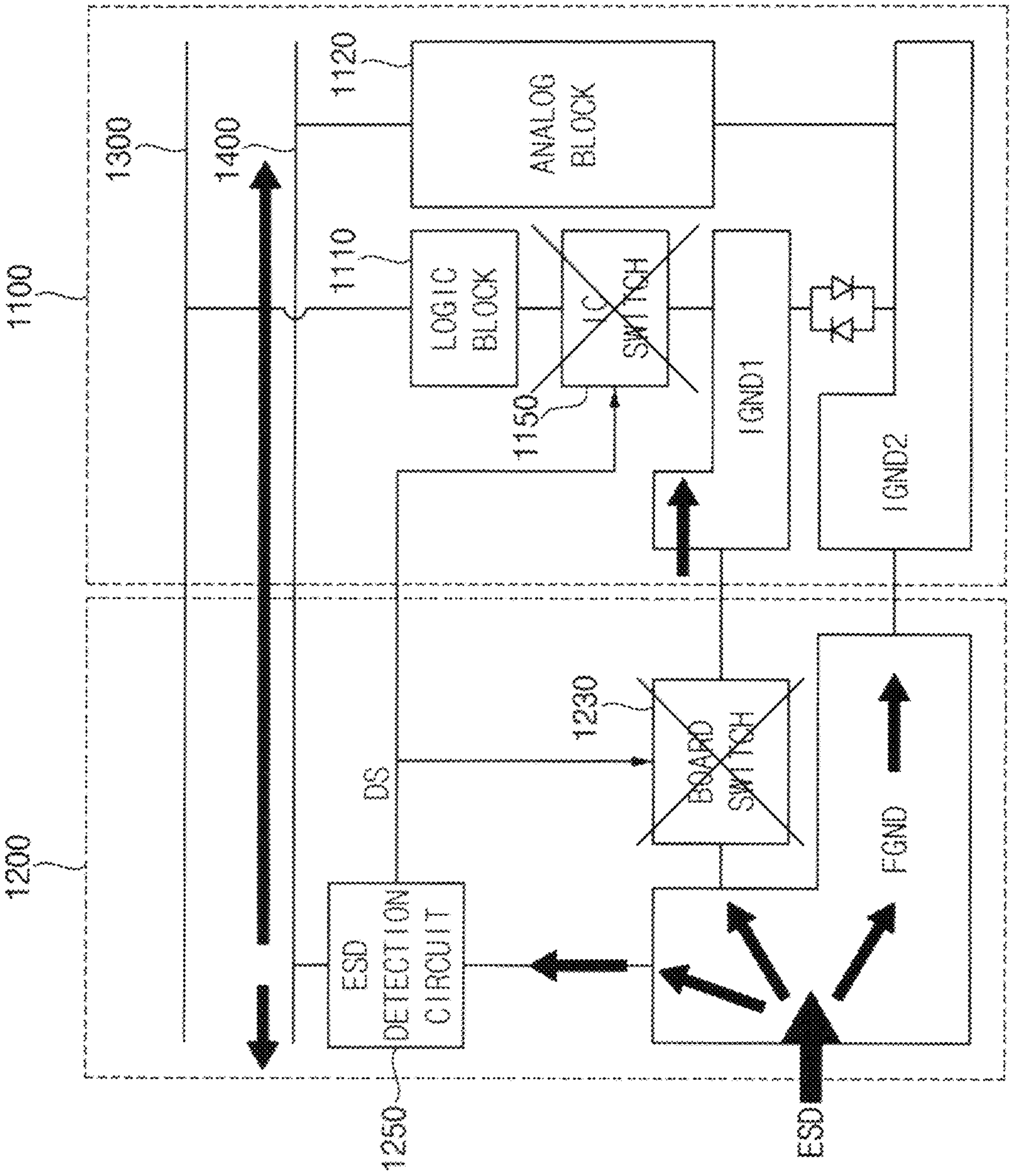
FIG. 22 is a diagram illustrating an example in which an electrostatic discharge current flows through the display apparatus of FIG. 21.

FIG. 21 is a diagram illustrating a display apparatus according to yet another embodiment of the present invention, and FIG. 22 is a diagram illustrating an example in which the electrostatic discharge current ESD flows through the display apparatus of FIG. 21.

The display apparatus according to the present embodiment is substantially the same as the display apparatus of FIG. 16 except for the IC switch 1150. Thus, the same reference numerals are used to refer to the same or similar element, and any repetitive explanation will be omitted.

Referring to FIG. 21, the IC region 1100 may further include the IC switch 1150 performing the switching operation between the logic block 1110 and the first IC ground IGND1. The IC switch may perform the switching operation based on the detection signal DS of the ESD detection circuit 1250. For example, the IC switch 1150 may include an element capable of performing the high-speed switching operation. For example, the IC switch 1150 may include the inverter and the PMOS transistor. For example, the IC switch 1150 may be the high-speed relay.

Referring to FIG. 22, the IC switch 1150 may be in a turn-off state when receiving the detection signal DS. The IC switch 1150 may be in a turn-on state when the detection signal DS is not applied and a voltage less than or equal to the second power voltage VCI is received.

For example, the IC switch 1150 may be a p-type transistor including a control electrode receiving the detection signal DS. In this case, when the electrostatic discharge current ESD does not flow, the IC switch 1150 may be turned on. When the electrostatic discharge current ESD flows, the detection signal DS may have a high voltage value. Accordingly, the IC switch 1150 may be in the turn-off state.

For example, the IC switch 1150 may be the high-speed relay. The high-speed relay may be in a turn-off state when the detection signal DS is changed to be greater than the preset reference voltage. The reference voltage may be greater than the second power voltage VCI. Accordingly, when the electrostatic discharge current ESD does not flow, the IC switch 1150 may be in the turn-on state. When the electrostatic discharge current ESD flows, the detection signal DS may be changed to be greater than the reference voltage. Due to this, the IC switch 1150 may be in the turn-off state.

Referring to FIG. 22, when the electrostatic discharge current ESD flows, the board switch 1230 and the IC switch 1150 may be in the turn-on state. Although the first power voltage VDDI and the second power voltage VCI are not illustrated in FIG. 22, the first power voltage VDDI and the second power voltage VCI may be applied to the first power line 1300 and the second power line 1400, respectively. If there is not the board switch 1230, a portion of the electrostatic discharge current ESD may flow to the first IC ground IGND1 and the second IC ground IGND2, so that the logic block 1110 may malfunction. If there is not the IC switch 1150, a portion of the electrostatic discharge current ESD may flow to the logic block 1110, so that the logic block 1110 may malfunction. However, since the board switch 1230 may prevent the electrostatic discharge current ESD from flowing to the first IC ground IGND1, the erroneous operation of the logic block 1110 may be effectively prevented. In addition, since the IC switch 1150 may prevent the electrostatic discharge current ESD from flowing to the logic block 1110, the erroneous operation of the logic block 1110 may be effectively prevented.

Figure 23:
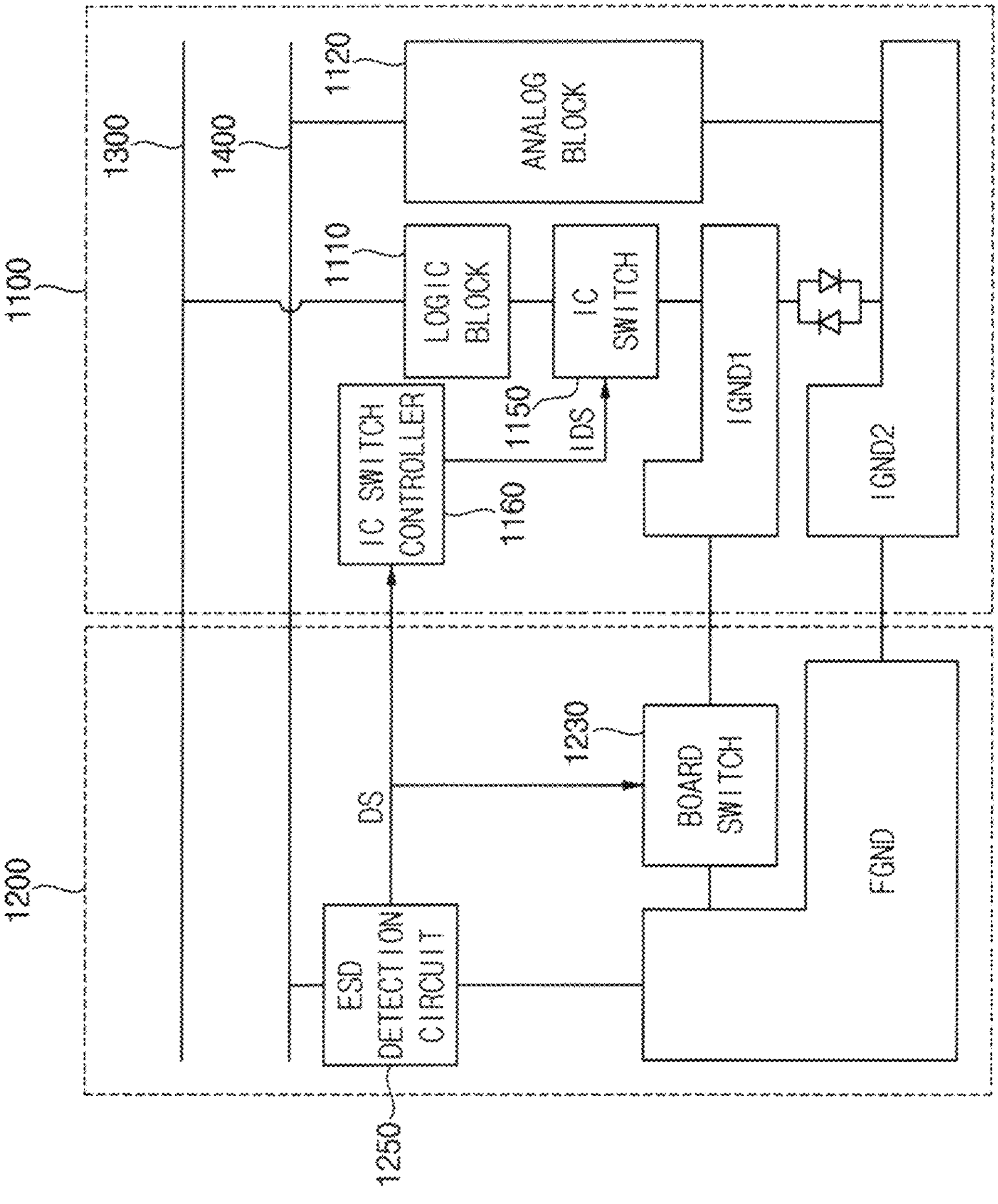
FIG. 23 is a diagram illustrating a display apparatus according to another embodiment of the present invention.

FIG. 23 is a diagram illustrating a display apparatus according to embodiments of the present invention.

The display apparatus according to the present embodiment is substantially the same as the display apparatus of FIG. 21 except for the IC switch controller 1160. Thus, the same reference numerals are used to refer to the same or similar element, and any repetitive explanation will be omitted.

Referring to FIG. 23, the IC region 1100 may further include the IC switch controller 1160. According to an embodiment, the IC switch controller 1160 may generate the IC adjustment detection signal IDS based on the detection signal DS. According to an embodiment, the IC switch 1150 may perform the switching operation based on the IC adjustment detection signal IDS. For example, the IC switch controller 1160 may adjust the detection signal DS by adjusting a timing and/or a duration of the switching operation performed by the IC switch 1150. For example, when a different result than expected is obtained when the display apparatus is actually operated, the IC switch 1150 may adjust the detection signal DS to generate the IC adjustment detection signal IDS. So, the IC switch 1150 may block the electrostatic discharge current ESD more efficiently.

Figure 24:
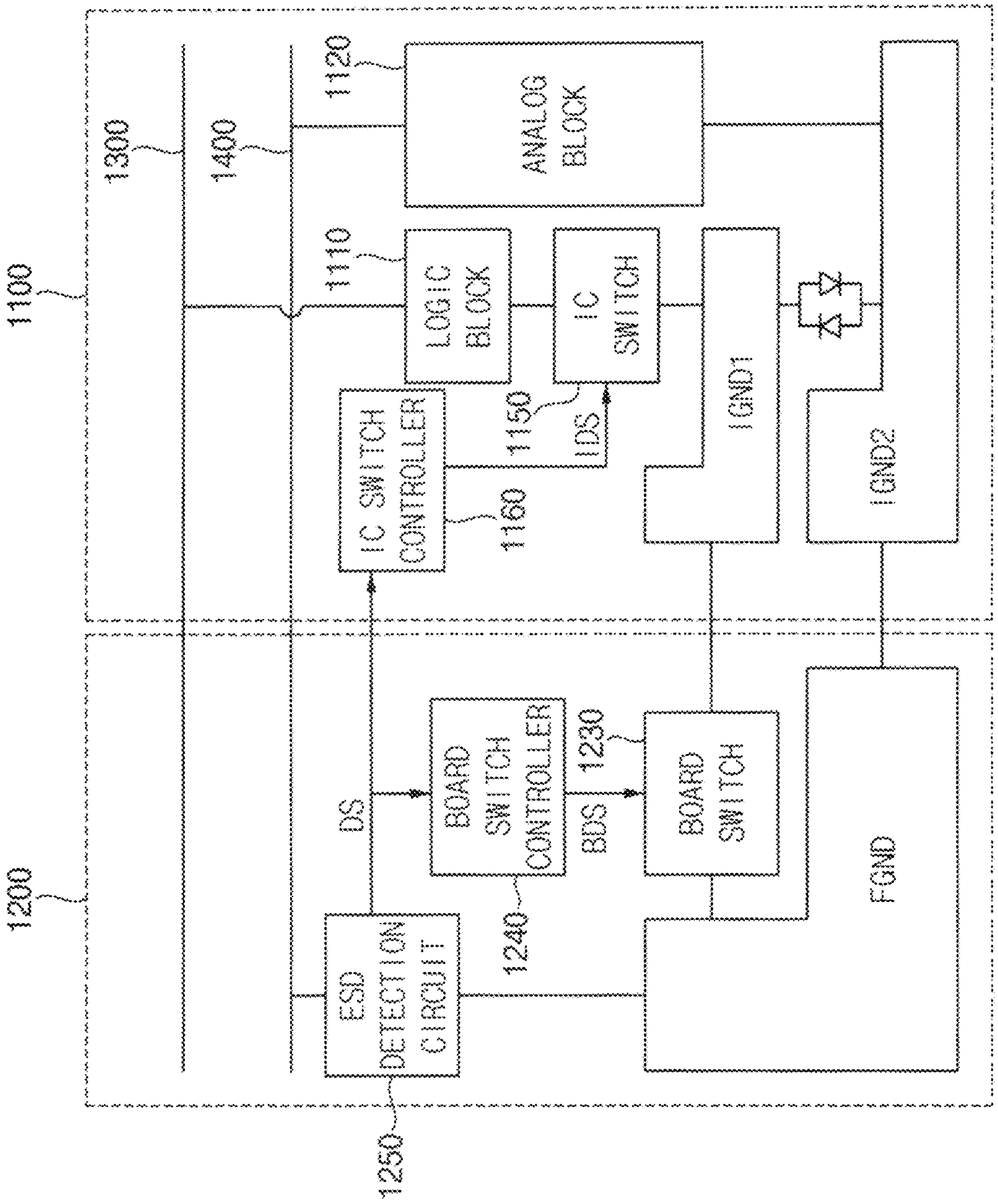
FIG. 24 is a diagram illustrating a display apparatus according to still another embodiment of the present invention.

FIG. 24 is a diagram illustrating a display apparatus according to still another embodiment of the present invention.

The display apparatus according to the present embodiment is substantially the same as the display apparatus of FIG. 23 except for the board switch controller 1240. Thus, the same reference numerals are used to refer to the same or similar element, and any repetitive explanation will be omitted.

Referring to FIG. 24, the printed circuit board region 1200 may further include the board switch controller 1240. According to an embodiment, the board switch controller 1240 may generate the board adjustment detection signal BDS based on the detection signal DS. According to an embodiment, the board switch 1230 may perform the switching operation based on the board adjustment detection signal BDS. For example, the board switch controller 1240 may adjust the detection signal DS by adjusting a timing and/or a duration of the switching operation performed by the board switch 1230. For example, when a different result than expected is obtained when the display apparatus is actually operated, the board switch 1230 may adjust the detection signal DS to generate the board adjustment detection signal BDS. So, the board switch 1230 may block the electrostatic discharge current ESD more efficiently.

Figure 25:
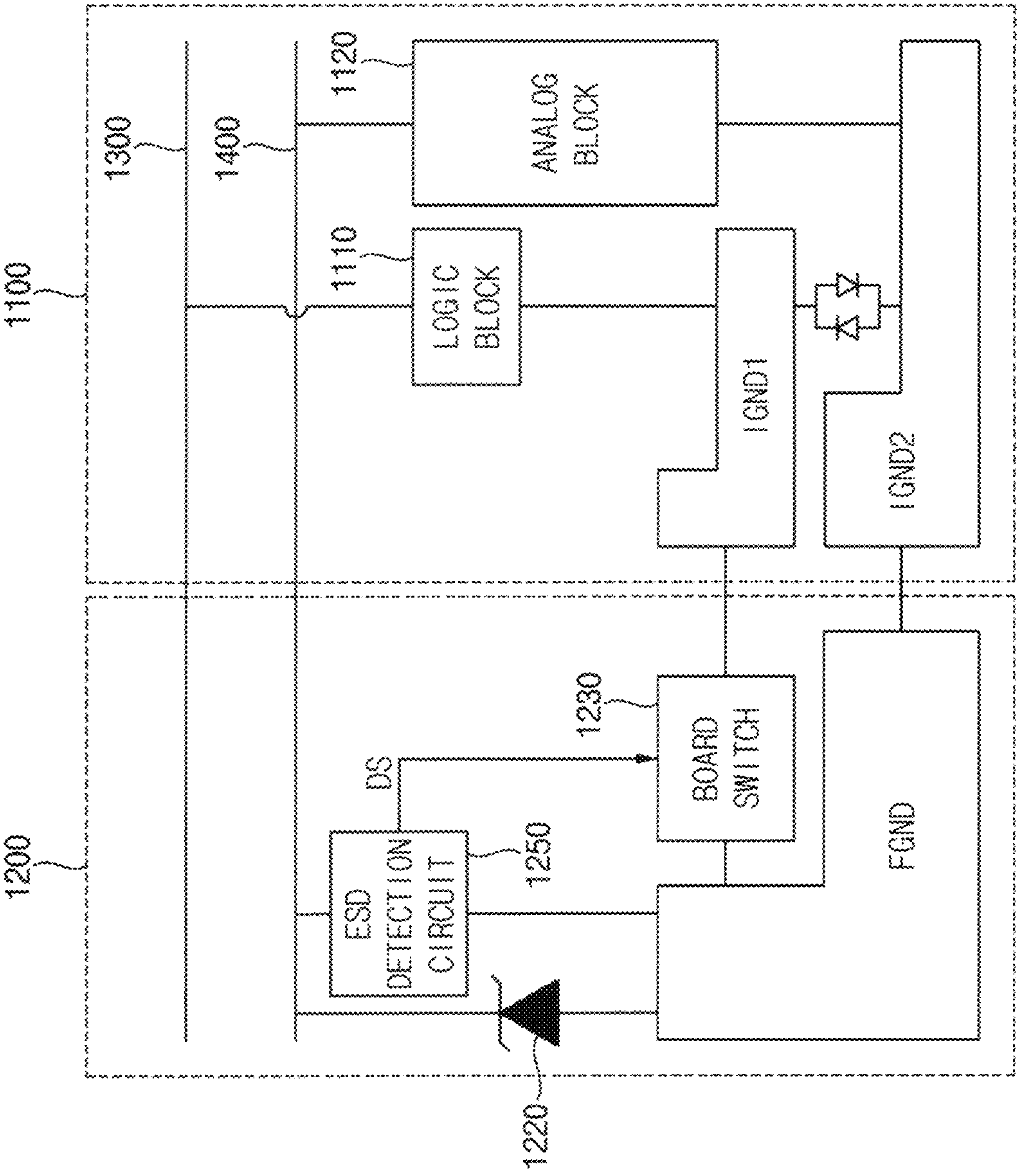
FIG. 25 is a diagram illustrating a display apparatus according to yet another embodiment of the present invention.

FIG. 25 is a diagram illustrating a display apparatus according to yet another embodiment of the present invention.

The display apparatus according to the present embodiment is substantially the same as the display apparatus of FIG. 16 except for the transient voltage suppressor diode 1220. Thus, the same reference numerals are used to refer to the same or similar element, and any repetitive explanation will be omitted.

Referring to FIG. 25, the display apparatus of FIG. 25 may further include the transient voltage suppressor diode 1220 including the first electrode connected to the second power line 1400 and the second electrode connected to the printed circuit board ground FGND. Accordingly, the display apparatus of FIG. 25 may prevent a permanent damage to the ICs in the IC region 1100 through the transient voltage suppressor diode 1220 and prevent an erroneous operation of the ICs in the IC region 1100 through the ESD detection circuit 1250.

The inventions may be applied to any electronic apparatus including the display apparatus. For example, the inventions may be applied to a television ("TV"), a digital TV, a 3D TV, a mobile phone, a smart phone, a tablet computer, a virtual reality ("VR") apparatus, a wearable electronic apparatus, a personal computer ("PC"), a home appliance, a laptop computer, a personal digital assistant ("PDA"), a portable multimedia player ("PMP"), a digital camera, a music player, a portable game console, a navigation apparatus, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display apparatus comprising:

a first power line;

a second power line;

an IC region including a logic block which receives a first power voltage from the first power line, an analog block which receives a second power voltage from the second power line, a first IC ground connected to the logic block, and a second IC ground connected to the analog block;

a printed circuit board region including a printed circuit board ground connected to the first IC ground and the second IC ground, a transient voltage suppressor diode including a first electrode connected to the second power line and a second electrode connected to the printed circuit board ground, and a board switch which performs a first switching operation between the printed circuit board ground and the first IC ground; and a display panel connected to the IC region, wherein the board switch is configured to perform the first switching operation based on a detection voltage detected from the first electrode of the transient voltage suppressor diode.

2. The display apparatus of claim 1, wherein the printed circuit board region further includes a board switch controller which generates a board adjustment detection voltage based on the detection voltage, and wherein the board switch is configured to perform the first switching operation based on the board adjustment detection voltage.

3. The display apparatus of claim 1, wherein the IC region further includes an IC switch which performs a second switching operation between the logic block and the first IC ground.

4. The display apparatus of claim 3, wherein the IC switch is configured to perform the second switching operation based on a detection voltage detected from the first electrode of the transient voltage suppressor diode.

5. The display apparatus of claim 4, wherein the IC region further includes an IC switch controller which generates an IC adjustment detection voltage based on the detection voltage, and wherein the IC switch is configured to perform the second switching operation based on the IC adjustment detection voltage.

6. The display apparatus of claim 1, wherein the first power voltage is less than the second power voltage.

7. A display apparatus comprising:

a first power line;

a second power line;

an IC region including a logic block which receives a first power voltage from the first power line, an analog block which receives a second power voltage from the second power line, a first IC ground connected to the logic block, a second IC ground connected to the analog block, and an IC switch which performs a switching operation between the logic block and the first IC ground;

a printed circuit board region including a printed circuit board ground connected to the first IC ground and the second IC ground, and a transient voltage suppressor diode including a first electrode connected to the second power line and a second electrode connected to the printed circuit board ground; and a display panel connected to the IC region.

8. The display apparatus of claim 7, wherein the IC switch is configured to perform the switching operation based on a detection voltage detected from the first electrode of the transient voltage suppressor diode.

9. The display apparatus of claim 8, wherein the IC region further includes an IC switch controller which generates an IC adjustment detection voltage based on the detection voltage, and wherein the IC switch is configured to perform the switching operation based on the IC adjustment detection voltage.

10. The display apparatus of claim 7, wherein the first power voltage is less than the second power voltage.

11. A display apparatus comprising:

a first power line;

a second power line;

an IC region including a logic block which receives a first power voltage from the first power line, an analog block which receives a second power voltage from the second power line, a first IC ground connected to the logic block, and a second IC ground connected to the analog block;

a printed circuit board region including a printed circuit board ground connected to the first IC ground and the second IC ground, an electrostatic discharge current (ESD) detection circuit disposed between the second power line and the printed circuit board ground, and a board switch which performs a third switching operation between the printed circuit board ground and the first IC ground; and a display panel connected to the IC region, wherein the board switch is configured to perform the third switching operation based on a detection signal of the ESD detection circuit.

12. The display apparatus of claim 11, wherein the ESD detection circuit includes a detection resistor element and a detection capacitor element connected to the detection resistor element in series.

13. The display apparatus of claim 11, wherein the printed circuit board region further includes a board switch controller which generates a board adjustment detection signal based on the detection signal, and wherein the board switch is configured to perform the third switching operation based on the board adjustment detection signal.

14. The display apparatus of claim 11, wherein the IC region further includes an IC switch which performs a fourth switching operation between the logic block and the first IC ground.

15. The display apparatus of claim 14, wherein the IC switch is configured to perform the fourth switching operation based on a detection signal of the ESD detection circuit.

16. The display apparatus of claim 15, wherein the IC region further includes an IC switch controller which generates an IC adjustment detection signal based on the detection signal, and wherein the IC switch is configured to perform the fourth switching operation based on the IC adjustment detection signal.

17. The display apparatus of claim 11, wherein the printed circuit board region further includes a transient voltage suppressor diode including a first electrode connected to the second power line and a second electrode connected to the printed circuit board ground.

18. The display apparatus of claim 11, wherein the first power voltage is less than the second power voltage.

* * * * *